(12) United States Patent
Suzuki et al.

(10) Patent No.: US 10,375,734 B2
(45) Date of Patent: Aug. 6, 2019

(54) MOBILE STATION APPARATUS, BASE STATION APPARATUS, WIRELESS COMMUNICATION METHOD, AND INTEGRATED CIRCUIT

(71) Applicant: Sharp Kabushiki Kaisha, Osaka-shi, Osaka (JP)

(72) Inventors: Shoichi Suzuki, Osaka (JP); Kimihiko Imamura, Osaka (JP); Tatsushi Aiba, Osaka (JP); Wataru Ouchi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 377 days.

(21) Appl. No.: 14/349,371

(22) PCT Filed: Sep. 24, 2012

(86) PCT No.: PCT/JP2012/074407
§ 371 (c)(1),
(2) Date: Apr. 3, 2014

(87) PCT Pub. No.: WO2013/051413
PCT Pub. Date: Apr. 11, 2013

(65) Prior Publication Data
US 2014/0247799 A1    Sep. 4, 2014

(30) Foreign Application Priority Data
Oct. 4, 2011    (JP) .................. 2011-219737

(51) Int. Cl.
*H04W 74/08*    (2009.01)
*H04J 13/22*    (2011.01)
*H04J 13/00*    (2011.01)

(52) U.S. Cl.
CPC ......... *H04W 74/0833* (2013.01); *H04J 13/22* (2013.01); *H04J 13/0062* (2013.01)

(58) Field of Classification Search
None
See application file for complete search history.

(56) References Cited

U.S. PATENT DOCUMENTS

2010/0135181 A1*  6/2010  Earnshaw ............. H04W 28/06
                                            370/252
2010/0195700 A1*  8/2010  Ogawa ................ H04J 13/0062
                                            375/132

(Continued)

FOREIGN PATENT DOCUMENTS

JP    2013-081055 A    5/2013

OTHER PUBLICATIONS

Sharp, "DMRS Enhancements for UL CoMP", 3GPP TSG RAN WG1 Meeting #68, Dresden, Germany, Feb. 6-10, 2012, R1-120277, 7 pages.

(Continued)

*Primary Examiner* — Ayaz R Sheikh
*Assistant Examiner* — Mariela Vidal Carpio
(74) *Attorney, Agent, or Firm* — Birch, Stewart, Kolasch & Birch, LLP

(57) ABSTRACT

To make a mobile station apparatus efficiently generate a base sequence. In a mobile station apparatus that generates a sequence for a demodulation reference signal on the basis of at least a sequence group number and transmits to a base station apparatus the demodulation reference signal together with a physical uplink shared channel used for transmission of a transport block, the mobile station apparatus receives information indicating a value of a parameter relating to the sequence from the base station apparatus, and determines the sequence group number without using the value of the parameter in a case where the mobile station apparatus (Continued)

performs transmission of the transport block on the physical uplink shared channel as part of a contention based random access procedure.

28 Claims, 11 Drawing Sheets

(56) References Cited

U.S. PATENT DOCUMENTS

| | | | |
|---|---|---|---|
| 2012/0063302 A1* | 3/2012 | Damnjanovic | H04W 56/0045 370/228 |
| 2012/0113938 A1* | 5/2012 | Larsson | H04W 74/008 370/329 |
| 2012/0281656 A1* | 11/2012 | Hooli | H04J 11/0023 370/329 |

OTHER PUBLICATIONS

Ericsson, ST-Ericsson, Potential Enhancements for DMRS in Rel-11, 3GPP TSG RAN WG1 Meeting #66, R1-112086, Athens, Greece, Aug. 22-26, 2011, pp. 1-6.

Technical Report,3rd Generation Partnership Project; Technical Specification Group Radio Access Network; Coordinated multi-point operation for LTE physical layer aspects (Release 11), 3GPP TR 36.819 V11.0.0, Sep. 2011, pp. 1-68.

Panasonic, "Uplink DMRS Sequence for RACH Procedure", 3GPP TSG-RAN WG1 Meeting 65, May 9-13, 2011 in Barcelona, Spain, R1-111583, 3 pages.

Sharp, "Clarification on OCC Application for UL DMRS," 3GPP TSG RAN WG1 Meeting #63bis, Dublin, Ireland, Jan. 17-21, 2011, pp. 1-5, R1-110277.

Sharp, "Clarification on OCC Application for UL DMRS," 3GPP TSG RAN WG1 Meeting #64, Taipei, Taiwan, Feb. 21-25, 2011, pp. 1-5, R1-111145.

\* cited by examiner

FIG. 7

| u | $\varphi(0), ..., \varphi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

FIG. 8

| u | φ(0), ..., φ(23) | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

MOBILE STATION APPARATUS, BASE STATION APPARATUS, WIRELESS COMMUNICATION METHOD, AND INTEGRATED CIRCUIT

TECHNICAL FIELD

The present invention relates to a mobile station apparatus, a base station apparatus, a wireless communication method, and an integrated circuit.

BACKGROUND ART

The evolution of radio access schemes and wireless networks for cellular mobile communication (hereinafter referred to as "Long Term Evolution (LTE)" or "Evolved Universal Terrestrial Radio Access: EUTRA") has been studied by the 3rd Generation Partnership Project (3GPP). In LTE, an orthogonal frequency division multiplexing (OFDM) scheme has been used as a communication scheme in the downlink from a base station apparatus to a mobile station apparatus. In addition, an SC-FDMA (Single-Carrier Frequency Division Multiple Access) scheme has been used as a communication scheme in the uplink from a mobile station apparatus to a base station apparatus. Here, in LTE, a base station apparatus is also called an eNodeB (evolved NodeB) and a mobile station apparatus is also called a UE (User Equipment). LTE is a cellular communication system in which a plurality of areas covered by a base station apparatus are arranged in a cellular form.

In LTE, a base station apparatus instructs a mobile station apparatus to perform initial transmission or retransmission of a PUSCH (Physical Uplink Shared Channel), which is a channel used for transmission of uplink data (or also referred to as an "uplink shared channel: UL-SCH"), by using Downlink Control Information (DCI) that is transmitted on a PDCCH (Physical Downlink Control Channel). A mobile station apparatus transmits a PUSCH in accordance with received downlink control information to a base station apparatus. A mobile station apparatus transmits a DMRS (Demodulation Reference Signal) together with a PUSCH to a base station apparatus. A DMRS is used in a base station apparatus for channel estimation and the like.

In LTE Release 11, support of Coordinated Multipoint Transmission/Reception (CoMP) in which interference coordination is performed between base station apparatuses (cells or transmission/reception points) in a mutually coordinated manner has been studied as a method of reducing or preventing interference with a mobile station apparatus or a base station apparatus. A transmission/reception point represents a transmission point and a reception point of a signal. A transmission/reception point may be a base station apparatus, for example (NPL 1).

In the case where a plurality of mobile station apparatuses that communicate with different cells (base station apparatuses or transmission/reception points) transmit PUSCHs in partially overlapping frequency bands, interference with an adjacent cell becomes a problem. FIG. 11 is a diagram illustrating interference signals from mobile station apparatuses to adjacent cells in the related art. In FIG. 11, an area covered by a base station apparatus A (transmission/reception point A) is a cell A, and an area covered by a base station apparatus B (transmission/reception point B) is a cell B. A mobile station apparatus A transmits a PUSCH and a DMRS to the base station apparatus A (transmission/reception point A), and a mobile station apparatus B transmits a PUSCH and a DMRS to the base station apparatus B (transmission/reception point B). In FIG. 11, thick arrows represent desired signals and dotted arrows represent interference signals.

In FIG. 11, in the case where a frequency band scheduled by the base station apparatus A for a PUSCH from the mobile station apparatus A partially overlaps a frequency band scheduled by the base station apparatus B for a PUSCH from the mobile station apparatus B, a PUSCH and a DMRS transmitted by the mobile station apparatus A become interference signals that interfere with the base station apparatus B, and a PUSCH and a DMRS transmitted by the mobile station apparatus B become interference signals that interfere with the base station apparatus A. To solve the foregoing problem, NPL 1 describes a technique in which, in the case where a plurality of mobile station apparatuses transmit PUSCHs in partially overlapping frequency bands, different base sequences for DMRSs are assigned to the mobile station apparatuses respectively.

CITATION LIST

Non Patent Literature

NPL 1: "TR36.819 version 11.0.0", 3GPP, Sep. 27, 2011.
NPL 2: "Potential Enhancements for DMRS in Rel-11", 3GPP TSG RAN WG1 Meeting #66, R1-112086, Aug. 22-26, 2011.

SUMMARY OF INVENTION

Technical Problem

In the related art, however, a base sequence for a DMRS for a PUSCH is determined in accordance with a cell-specific parameter and therefore different base sequences cannot be assigned to respective mobile station apparatuses that communicate with the same cell, which has been a problem.

The present invention has been devised in view of the foregoing problem and an object thereof is to provide a mobile station apparatus, a base station apparatus, a wireless communication method, and an integrated circuit that enable a mobile station apparatus to generate a base sequence efficiently.

Solution to Problem (1) To achieve the foregoing object, the present invention has taken the following measures. That is, a mobile station apparatus according to the present invention is a mobile station apparatus that generates a sequence for a demodulation reference signal on the basis of at least a sequence group number and transmits to a base station apparatus the demodulation reference signal together with a physical uplink shared channel used for transmission of a transport block. The mobile station apparatus receives information indicating a value of a parameter relating to the sequence from the base station apparatus, and determines the sequence group number without using the value of the parameter in a case where the mobile station apparatus performs transmission of the transport block on the physical uplink shared channel as part of a contention based random access procedure.

(2) Furthermore, the mobile station apparatus according to the present invention determines the sequence group number by using at least the value of the parameter in a case where the mobile station apparatus performs transmission of the transport block on the physical uplink shared channel regardless of the contention based random access procedure.

(3) A mobile station apparatus according to the present invention is a mobile station apparatus that generates a sequence for a demodulation reference signal on the basis of at least a sequence group number and transmits to a base station apparatus the demodulation reference signal together with a physical uplink shared channel used for transmission of a transport block. The mobile station apparatus receives information indicating a value of a parameter relating to the sequence from the base station apparatus, and determines the sequence group number without using the value of the parameter in a case where a cyclic redundancy check code added to a latest downlink control information format used for scheduling of the physical uplink shared channel relating to the transport block has been scrambled with a temporary C-RNTI.

(4) Furthermore, the mobile station apparatus according to the present invention determines the sequence group number without using the value of the parameter in a case where the mobile station apparatus has not received the downlink control information format, and the physical uplink shared channel relating to initial transmission of the transport block has been scheduled in accordance with a random access response grant supporting a contention based random access procedure.

(5) Furthermore, the mobile station apparatus according to the present invention determines the sequence group number by using at least the value of the parameter in a case where the cyclic redundancy check code added to the latest downlink control information format has been scrambled with a C-RNTI.

(6) Furthermore, the mobile station apparatus according to the present invention determines the sequence group number by using at least the value of the parameter in a case where a latest downlink control information format used for scheduling of the physical uplink shared channel relating to the transport block is downlink control information format 4. The downlink control information format 4 is used for scheduling of the physical uplink shared channel transmitted by the mobile station apparatus using spatial multiplexing.

(7) Furthermore, the mobile station apparatus according to the present invention determines the sequence group number by using at least the value of the parameter in a case where a resource for the physical uplink shared channel relating to transmission of the transport block has been persistently scheduled.

(8) A base station apparatus according to the present invention is a base station apparatus that receives from a mobile station apparatus a demodulation reference signal together with a physical uplink shared channel used for transmission of a transport block. The base station apparatus transmits to the mobile station apparatus information indicating a value of a parameter relating to a sequence, and receives the demodulation reference signal according to the sequence generated by the mobile station apparatus on the basis of at least a sequence group number determined by the mobile station apparatus without using the value of the parameter in a case where the base station apparatus performs reception of the transport block that has been transmitted on the physical uplink shared channel as part of a contention based random access procedure.

(9) Furthermore, the base station apparatus according to the present invention receives the demodulation reference signal according to the sequence generated by the mobile station apparatus on the basis of at least the sequence group number determined by the mobile station apparatus by using at least the value of the parameter in a case where the base station apparatus performs reception of the transport block that has been transmitted on the physical uplink shared channel regardless of the contention based random access procedure.

(10) A base station apparatus according to the present invention is a base station apparatus that receives from a mobile station apparatus the demodulation reference signal together with a physical uplink shared channel used for transmission of a transport block. The base station apparatus transmits to the mobile station apparatus information indicating a value of a parameter relating to a sequence, and receives the demodulation reference signal according to the sequence generated by the mobile station apparatus on the basis of at least a sequence group number determined by the mobile station apparatus without using the value of the parameter in a case where the base station apparatus has transmitted a downlink control information format used for scheduling of the physical uplink shared channel relating to the transport block, and has scrambled a cyclic redundancy check code added to a latest downlink control information format with a temporary C-RNTI.

(11) Furthermore, the base station apparatus according to the present invention receives the demodulation reference signal according to the sequence generated by the mobile station apparatus on the basis of at least the sequence group number determined by the mobile station apparatus without using the value of the parameter in a case where the base station apparatus has not transmitted the downlink control information format, and has scheduled the physical uplink shared channel relating to initial transmission of the transport block in accordance with a random access response grant supporting a contention based random access procedure.

(12) Furthermore, the base station apparatus according to the present invention receives the demodulation reference signal according to the sequence generated by the mobile station apparatus on the basis of at least the sequence group number determined by the mobile station apparatus by using at least the value of the parameter in a case where the base station apparatus has scrambled the cyclic redundancy check code added to the latest downlink control information format with a C-RNTI.

(13) Furthermore, the base station apparatus according to the present invention receives the demodulation reference signal according to the sequence generated by the mobile station apparatus on the basis of at least the sequence group number determined by the mobile station apparatus by using at least the value of the parameter in a case where the latest downlink control information format is downlink control information format 4. The downlink control information format 4 is used for scheduling of the physical uplink shared channel transmitted by the mobile station apparatus using spatial multiplexing.

(14) A wireless communication method according to the present invention is a wireless communication method used in a mobile station apparatus that generates a sequence for a demodulation reference signal on the basis of at least a sequence group number and transmits to a base station apparatus the demodulation reference signal together with a physical uplink shared channel used for transmission of a transport block. The method includes receiving information indicating a value of a parameter relating to the sequence from the base station apparatus, and determining the sequence group number without using the value of the parameter in a case where the mobile station apparatus performs transmission of the transport block on the physical uplink shared channel as part of a contention based random access procedure.

(15) A wireless communication method according to the present invention is a wireless communication method used in a mobile station apparatus that generates a sequence for a demodulation reference signal on the basis of at least a sequence group number and transmits to a base station apparatus the demodulation reference signal together with a physical uplink shared channel used for transmission of a transport block. The method includes receiving information indicating a value of a parameter relating to the sequence from the base station apparatus, and determining the sequence group number without using the value of the parameter in a case where a cyclic redundancy check code added to a latest downlink control information format used for scheduling of the physical uplink shared channel relating to the transport block has been scrambled with a temporary C-RNTI.

(16) A wireless communication method according to the present invention is a wireless communication method used in a base station apparatus that receives from a mobile station apparatus a demodulation reference signal together with a physical uplink shared channel used for transmission of a transport block. The method includes transmitting to the mobile station apparatus information indicating a value of a parameter relating to a sequence, and receiving the demodulation reference signal according to the sequence generated by the mobile station apparatus on the basis of at least a sequence group number determined by the mobile station apparatus without using the value of the parameter in a case where the base station apparatus performs reception of the transport block that has been transmitted on the physical uplink shared channel as part of a contention based random access procedure.

(17) A wireless communication method according to the present invention is a wireless communication method used in a base station apparatus that receives from a mobile station apparatus the demodulation reference signal together with a physical uplink shared channel used for transmission of a transport block. The method includes transmitting to the mobile station apparatus information indicating a value of a parameter relating to a sequence, and receiving the demodulation reference signal according to the sequence generated by the mobile station apparatus on the basis of at least a sequence group number determined by the mobile station apparatus without using the value of the parameter in a case where the base station apparatus has transmitted a downlink control information format used for scheduling of the physical uplink shared channel relating to the transport block, and has scrambled a cyclic redundancy check code added to a latest downlink control information format with a temporary C-RNTI.

(18) An integrated circuit according to the present invention is an integrated circuit mounted in a mobile station apparatus that generates a sequence for a demodulation reference signal on the basis of at least a sequence group number and transmits to a base station apparatus the demodulation reference signal together with a physical uplink shared channel used for transmission of a transport block. The integrated circuit causes the mobile station apparatus to implement a function of receiving information indicating a value of a parameter relating to the sequence from the base station apparatus, and a function of determining the sequence group number without using the value of the parameter in a case where the mobile station apparatus performs transmission of the transport block on the physical uplink shared channel as part of a contention based random access procedure.

(19) An integrated circuit according to the present invention is an integrated circuit mounted in a mobile station apparatus that generates a sequence for a demodulation reference signal on the basis of at least a sequence group number and transmits to a base station apparatus the demodulation reference signal together with a physical uplink shared channel used for transmission of a transport block. The integrated circuit causes the mobile station apparatus to implement a function of receiving information indicating a value of a parameter relating to the sequence from the base station apparatus, and a function of determining the sequence group number without using the value of the parameter in a case where a cyclic redundancy check code added to a latest downlink control information format used for scheduling of the physical uplink shared channel relating to the transport block has been scrambled with a temporary C-RNTI.

(20) An integrated circuit according to the present invention is an integrated circuit mounted in a base station apparatus that receives from a mobile station apparatus a demodulation reference signal together with a physical uplink shared channel used for transmission of a transport block. The integrated circuit causes the base station apparatus to implement a function of transmitting to the mobile station apparatus information indicating a value of a parameter relating to a sequence, and a function of receiving the demodulation reference signal according to the sequence generated by the mobile station apparatus on the basis of at least a sequence group number determined by the mobile station apparatus without using the value of the parameter in a case where the base station apparatus performs reception of the transport block that has been transmitted on the physical uplink shared channel as part of a contention based random access procedure.

(21) An integrated circuit according to the present invention is an integrated circuit mounted in a base station apparatus that receives from a mobile station apparatus the demodulation reference signal together with a physical uplink shared channel used for transmission of a transport block. The integrated circuit causes the base station apparatus to implement a function of transmitting to the mobile station apparatus information indicating a value of a parameter relating to a sequence, and a function of receiving the demodulation reference signal according to the sequence generated by the mobile station apparatus on the basis of at least a sequence group number determined by the mobile station apparatus without using the value of the parameter in a case where the base station apparatus has transmitted a downlink control information format used for scheduling of the physical uplink shared channel relating to the transport block, and has scrambled a cyclic redundancy check code added to a latest downlink control information format with a temporary C-RNTI.

Advantageous Effects of Invention

According to the present invention, a mobile station apparatus is able to generate a base sequence efficiently.

BRIEF DESCRIPTION OF DRAWINGS

FIG. 7 is a table illustrating φ(•) for the length of 12 in the present invention.

FIG. 8 is a table illustrating φ(•) for the length of 24 in the present invention.

DESCRIPTION OF EMBODIMENTS

First Embodiment

Hereinafter, a first embodiment of the present invention will be described in detail with reference to the drawings.

First, physical channels of the present invention will be described.

Figure 1:
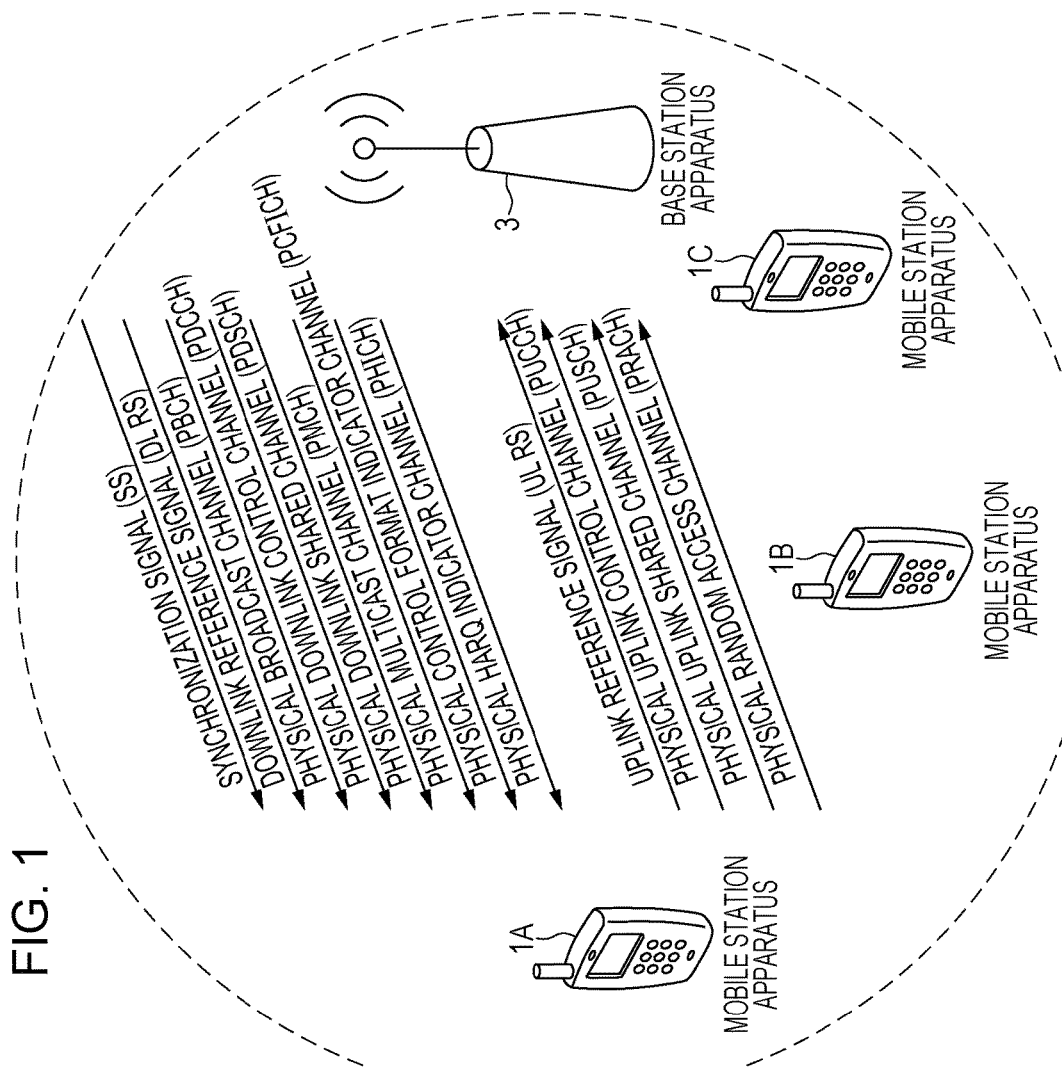
FIG. 1 is a schematic diagram of a wireless communication system of the present invention.

FIG. 1 is a schematic diagram of a wireless communication system of the present invention. In FIG. 1, a wireless communication system includes mobile station apparatuses 1A to 1C and a base station apparatus 3. FIG. 1 illustrates downlink wireless communication from the base station apparatus 3 to the mobile station apparatuses 1A to 1C, in which a Synchronization Signal (SS), a Downlink Reference Signal (DL RS), a Physical Broadcast Channel (PBCH), a Physical Downlink Control Channel (PDCCH), a Physical Downlink Shared Channel (PDSCH), a Physical Multicast Channel (PMCH), a Physical Control Format Indicator Channel (PCFICH), and a Physical Hybrid ARQ Indicator Channel (PHICH) are used.

FIG. 1 also illustrates uplink wireless communication from the mobile station apparatuses 1A to 1C to the base station apparatus 3, in which an Uplink Reference Signal (UL RS), a Physical Uplink Control Channel (PUCCH), a Physical Uplink Shared Channel (PUSCH), and a Physical Random Access Channel (PRACH) are used. The mobile station apparatuses 1A to 1C are hereinafter individually referred to as a mobile station apparatus 1.

A synchronization signal is a signal used for the mobile station apparatus 1 to establish synchronization in the downlink frequency domain and in the downlink time domain. A downlink reference signal is a signal used for the mobile station apparatus 1 to establish synchronization in the downlink frequency domain and in the downlink time domain, for the mobile station apparatus 1 to measure downlink reception quality, or for the mobile station apparatus 1 to perform channel correction for a PDSCH or a PDCCH. A PBCH is a physical channel used to broadcast a control parameter (system information) (Broadcast Channel: BCH) used by the mobile station apparatus 1 in a shared manner. A PBCH is transmitted at 40-ms intervals. The timings of the 40-ms intervals are detected in the mobile station apparatus 1 with blind detection.

A PDCCH is a physical channel used to transmit Downlink Control Information (DCI), such as a downlink assignment (or also referred to as a downlink grant) or an uplink grant. A downlink assignment is constituted by information (Modulation and Coding Scheme: MCS) regarding the modulation scheme and the coding rate of a PDSCH, information indicating assignment of a radio resource, and the like. An uplink grant is constituted by information regarding the modulation scheme and the coding rate of a PUSCH, information indicating assignment of a radio resource, and the like.

For downlink control information, a plurality of formats are used. Formats of downlink control information are called DCI formats. As DCI formats of an uplink grant, DCI format 0 that is used in the case where the mobile station apparatus 1 transmits a PUSCH with a single transmission antenna port, DCI format 4 that is used in the case where the mobile station apparatus 1 transmits a plurality of pieces of uplink data on a PUSCH by using MIMO SM (Multiple Input Multiple Output Spatial Multiplexing), and the like are available, for example. The mobile station apparatus 1 monitors DCI format 0 and DCI format 4 simultaneously for a PDCCH and, in the case where DCI format 0 is detected, transmits a PUSCH by using a single transmission antenna port and, in the case where DCI format 4 is detected, transmits a PUSCH by using a plurality of transmission antenna ports (MIMO SM).

MIMO SM is a technique in which transmission and reception are performed by multiplexing a plurality of signals on a plurality of channels in the spatial dimension implemented by a plurality of transmission antenna ports and a plurality of reception antenna ports. Here, an antenna port means a logical antenna used for signal processing. One antenna port may be constituted by one physical antenna or may be constituted by a plurality of physical antennas. On a transmission side using MIMO SM, processing (referred to as precoding) for forming appropriate spatial channels for a plurality of signal sequences (layers) is performed, and a plurality of signals on which precoding processing has been performed are transmitted by using a plurality of transmission antennas. On a receiving side using MIMO SM, processing is performed on a plurality of signals that have been received by using a plurality of reception antennas for appropriately demultiplexing signal sequences (layers) multiplexed on the channels in the spatial dimension.

For example, DCI format 4 includes information (resource block assignment) that indicates assignment of a radio resource of a PUSCH, a TPC (Transmission Power Control) command used for transmission power control of the PUSCH, information (hereinafter referred to as cyclic shift information) used to determine a cyclic shift used for an uplink reference signal time-multiplexed with the PUSCH (cyclic shift for demodulation reference signal), the number of sequences that are spatially multiplexed, information (precoding information) that specifies precoding to be performed on these sequences, information (Modulation and Coding Scheme and Redundancy Version: MCS&RV) regarding the modulation scheme, coding scheme, and redundancy version, and information (New Data Indicator: NDI) indicating initial transmission or retransmission of uplink data. The redundancy version is information indicating a portion in a bit sequence obtained by coding the uplink data, which is to be transmitted on the PUSCH by the mobile station apparatus 1.

The MCS&RV and the NDI included in DCI format 4 are provided for each of a plurality of pieces of uplink data controlled by DCI format 4. That is, by using DCI format 4, the base station apparatus 3 can set the transport block size, modulation scheme, and coding rate for each piece of uplink data to be transmitted on the same PUSCH, and can instruct the mobile station apparatus 1 to perform initial transmission or retransmission of each piece of uplink data.

A method of coding downlink control information will be described. First, the base station apparatus 3 adds to downlink control information a sequence obtained by scrambling a Cyclic Redundancy Check (CRC) code generated on the basis of the downlink control information, with an RNTI (Radio Network temporary Identifier). The mobile station apparatus 1 changes interpretation of downlink control information in accordance with an RNTI with which the cyclic redundancy check code has been scrambled.

For example, in the case where the cyclic redundancy check code has been scrambled with a C-RNTI (Cell-Radio Network Temporary Identifier) assigned to the mobile station apparatus 1 by the base station apparatus 3, the mobile station apparatus 1 determines that the downlink control information indicates a radio resource for the mobile station apparatus 1. In the case where the cyclic redundancy check code has been scrambled with an SPS (Semi Persistent Scheduling) C-RNTI assigned to the mobile station apparatus 1 by the base station apparatus 3, the mobile station apparatus 1 determines that the downlink control information indicates persistent (periodic) assignment of a radio resource for the mobile station apparatus 1, persistent release of a radio resource, or retransmission of a PUSCH transmitted by using a persistent radio resource.

In the case where the cyclic redundancy check code has been scrambled with a Temporary C-RNTI assigned to a random access preamble that has been transmitted by the mobile station apparatus 1 in a random access message 2, the mobile station apparatus 1 determines that the downlink control information indicates a radio resource for retransmission of a random access message 3 that has been transmitted by the mobile station apparatus 1. The details of random access will be described below.

Hereinafter, a state where a cyclic redundancy check code scrambled with an RNTI is added to downlink control information will be simply described as a state where an RNTI is contained in downlink control information or a state where an RNTI is contained in a PDCCH.

The mobile station apparatus 1 decodes a PDCCH, descrambles a sequence corresponding to a cyclic redundancy check code scrambled with an RNTI by using an RNTI stored in the mobile station apparatus 1, and determines that the PDCCH is successfully obtained in the case where the mobile station apparatus 1 detects no error on the basis of the descrambled cyclic redundancy check code. The foregoing processing is called blind decoding.

A PDSCH is a physical channel used to transmit system information other than a BCH, which is not broadcasted in paging information (Paging Channel: PCH) or on a PBCH, or downlink data (Downlink Shared Channel: DL-SCH). A PMCH is a physical channel used to transmit information (Multicast Channel: MCH) regarding MBMS (Multimedia Broadcast and Multicast Service). A PCFICH is a physical channel used to transmit information indicating a region where a PDCCH is arranged.

A PHICH is a physical channel used to transmit an HARQ indicator indicating success or failure of decoding of uplink data received by the base station apparatus 3. An HARQ indicator indicates ACK (acknowledgement) or MACK (negative-acknowledgement). Note that HARQ indicators respectively corresponding to a plurality of pieces of uplink data contained in the same PUSCH are transmitted in a plurality of PHICHs. In the case where the mobile station apparatus 1 receives an HARQ indicator indicating NACK for uplink data, the mobile station apparatus 1 retransmits the uplink data on a PUSCH in accordance with the latest uplink grant (an uplink grant that has been received lately) for the uplink data. Note that, in the case where the mobile station apparatus 1 has received an HARQ indicator and an uplink grant simultaneously, the mobile station apparatus 1 transmits uplink data on a PUSCH in accordance with the uplink grant.

A PUCCH is a physical channel used to transmit Uplink Control Information (UCI), which is information used for communication control, such as Channel Quality Information indicating downlink channel quality, a Scheduling Request (SR) indicating a request for assignment of an uplink radio resource, or ACK/NACK that respectively indicate success or failure of decoding of downlink data received by the mobile station apparatus 1.

A PUSCH is a physical channel used to transmit uplink data and uplink control information. A PRACH is a physical channel used to transmit a random access preamble. A PRACH is used mainly for the mobile station apparatus 1 to establish synchronization in the time domain with the base station apparatus 3, and is also used for initial access, hand over, a reconnection request, and a request for assignment of an uplink radio resource.

An uplink reference signal is a signal used for the base station apparatus 3 to establish synchronization in the uplink time domain, used for the base station apparatus 3 to measure uplink reception quality, or used for the base station apparatus 3 to perform channel correction of a PUSCH or a PUCCH. Examples of an uplink reference signal include a Demodulation Reference Signal (DMRS) that is time-multiplexed with a PUSCH or a PUCCH and transmitted, and a Sounding Reference Signal (SRS) that is transmitted independently of a PUSCH and a PUCCH.

On an uplink reference signal, code spreading using a CAZAC (Constant Amplitude and Zero Auto-Correlation) sequence is performed. A CAZAC sequence is a sequence that has a constant amplitude and excellent auto-correlation properties in the time domain and in the frequency domain. Since a CAZAC sequence has a constant amplitude in the time domain, it is possible to keep a PAPR (Peak to Average Power Ratio) low. A CAZAC sequence is hereinafter referred to as a base sequence. A cyclic delay is applied to an uplink reference signal in the time domain. A cyclic delay in the time domain is called a cyclic shift. By phase-rotating a base sequence in the frequency domain for each subcarrier, a signal cyclic-shifted in the time domain can be obtained. Note that a phase rotation amount in the frequency domain is also called a cyclic shift amount or simply a cyclic shift.

To generate a DMRS, an OCC (Orthogonal Cover Code) is used in addition to a cyclic shift. An OCC is a sequence (spreading code) used to code-spread a DMRS for each SC-FDMA symbol in the time domain. In the present invention, two OCCs, [+1, +1] and [+1, −1], are used. An OCC used for a DMRS is determined by using cyclic shift information contained in an uplink grant. The phase rotation amount of a cyclic shift used for generation of a DMRS is determined from random numbers generated from input, such as cyclic shift information contained in an uplink grant, an eNodeB-specific (cell-specific or reception point-specific) parameter communicated from the base station apparatus 3, and a physical cell identity assigned from a network to a cell that is managed by the base station apparatus 3.

In the case where base sequences for DMRSs become the same in the mobile station apparatuses 1, for the base station apparatus 3 in each cell, a transmission signal from the mobile station apparatus 1 that belongs to an adjacent cell becomes an interfering signal. In order to avoid base sequences for DMRSs being consecutively the same in the mobile station apparatuses 1, sequence group hopping and sequence hopping are used so that the sequence group number and base sequence number differ from slot to slot.

Uplink data (UL-SCH), downlink data (DL-SCH), and the like are transport channels. A unit of uplink data transmitted on a PUSCH and a unit of downlink data transmitted on a PDSCH are called transport blocks. A transport block is a unit handled in the MAC (Media Access Control) layer and control of HARQ (retransmission) is performed for each transport block.

In the physical layer, a transport block is associated with a codeword, and signal processing such as coding is performed for each codeword. The transport block size is the number of bits of a transport block. The mobile station apparatus 1 recognizes the transport block size from the number of Physical Resource Blocks (PRBs) indicated by information that indicates radio resource assignment and the MCS (MCS&RV) contained in an uplink grant or in a downlink assignment.

Hereinafter, the apparatus configuration of the present invention will be described.

Figure 2:
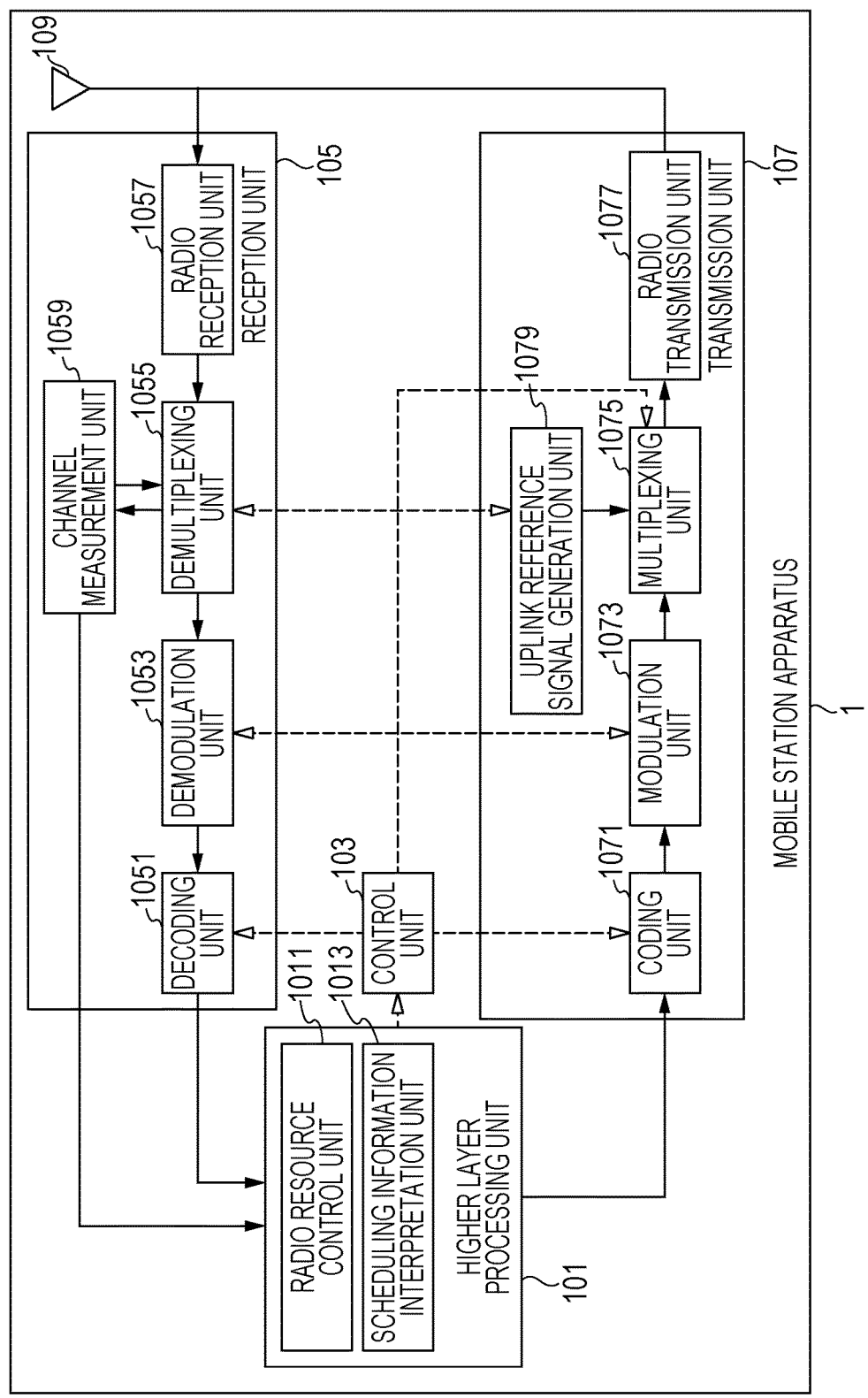
FIG. 2 is a block diagram schematically illustrating a configuration of a mobile station apparatus 1 of the present invention.

FIG. 2 is a block diagram schematically illustrating a configuration of the mobile station apparatus 1 of the present invention. As illustrated, the mobile station apparatus 1 includes a higher layer processing unit 101, a control unit 103, a reception unit 105, a transmission unit 107, and a transmission/reception antenna 109. The higher layer processing unit 101 includes a radio resource control unit 1011 and a scheduling information interpretation unit 1013. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs uplink data (a transport block) generated by operations or the like performed by a user to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various types of configuration information of the mobile station apparatus 1. For example, the radio resource control unit 1011 manages RNTIs, such as a C-RNTI, and manages parameters used for generation of a DMRS sequence for a PUSCH. The radio resource control unit 1011 generates information to be arranged on uplink channels and outputs the information to the transmission unit 107.

The scheduling information interpretation unit 1013 included in the higher layer processing unit 101 interprets information used for scheduling of physical channels (a PUSCH, a PDSCH, and the like) received via the reception unit 105, generates control information in order to control the reception unit 105 and the transmission unit 107 on the basis of the result of interpretation of the information, and outputs the control information to the control unit 103.

The control unit 103 generates a control signal used to control the reception unit 105 and the transmission unit 107, on the basis of the control information from the higher layer processing unit 101. The control unit 103 outputs the generated control signal to the reception unit 105 and to the transmission unit 107 and controls the reception unit 105 and the transmission unit 107.

The reception unit 105 demultiplexes, demodulates, and decodes a reception signal received from the base station apparatus 3 via the transmission/reception antenna 109, in accordance with the control signal received from the control unit 103, and outputs the decoded information to the higher layer processing unit 101.

The radio reception unit 1057 converts (down-converts) a downlink signal received via the transmission/reception antenna 109 into an intermediate frequency signal, removes an unnecessary frequency component, controls the amplification level so that the signal level is appropriately maintained, performs orthogonal demodulation on the basis of an in-phase component and an orthogonal component of the received signal, and converts the analog signal on which orthogonal demodulation has been performed into a digital signal. The radio reception unit 1057 removes from the converted digital signal portions corresponding to Guard Intervals (GIs), performs Fast Fourier Transform (FFT) on the signal from which the guard intervals have been removed, and extracts the signal in the frequency domain.

The demultiplexing unit 1055 demultiplexes the extracted signal into a PHICH, a PDCCH, a PDSCH, and a downlink reference signal. Not that this demultiplexing is performed on the basis of radio resource assignment information communicated in downlink control information. The demultiplexing unit 1055 performs channel compensation for the PHICH, PDCCH, and PDSCH, from a channel estimation value received from the channel measurement unit 1059. Furthermore, the demultiplexing unit 1055 outputs the demultiplexed downlink reference signal to the channel measurement unit 1059.

The demodulation unit 1053 multiplies a PHICH by a corresponding code to thereby combine the two, demodulates the combined signal using a BPSK (Binary Phase Shift Keying) modulation scheme, and outputs the result to the decoding unit 1051. The decoding unit 1051 decodes the PHICH addressed to the mobile station apparatus 1 and outputs the decoded HARQ indicator to the higher layer processing unit 101. The demodulation unit 1053 demodulates a PDCCH using a QPSK demodulation scheme and outputs the result to the decoding unit 1051. The decoding unit 1051 attempts blind decoding of the PDCCH and, if blind decoding is successful, outputs the decoded downlink control information and an RNTI contained in the downlink control information to the higher layer processing unit 101.

The demodulation unit 1053 demodulates a PDSCH using a modulation scheme communicated in a downlink assignment, such as QPSK (Quadrature Phase Shift Keying), 16QAM (Quadrature Amplitude Modulation), 64QAM, or the like and outputs the result to the decoding unit 1051. The decoding unit 1051 performs decoding on the basis of information regarding the coding rate communicated in downlink control information and outputs the decoded downlink data (transport block) to the higher layer processing unit 101.

The channel measurement unit 1059 measures the downlink path loss and channel state from the downlink reference signal received from the demultiplexing unit 1055 and outputs the measured path loss and channel state to the higher layer processing unit 101. The channel measurement unit 1059 calculates a downlink channel estimation value from the downlink reference signal and outputs the result to the demultiplexing unit 1055.

The transmission unit 107 generates an uplink reference signal in accordance with the control signal received from the control unit 103, codes and modulates the uplink data (transport block) received from the higher layer processing unit 101, multiplexes the PUCCH, PUSCH, and generated uplink reference signal, and transmits the result to the base station apparatus 3 via the transmission/reception antenna 109.

The coding unit 1071 performs coding, such as convolution coding or block coding, on uplink control information received from the higher layer processing unit 101. The coding unit 1071 performs turbo coding on the basis of information used for scheduling of a PUSCH.

The modulation unit 1073 modulates the coded bits received from the coding unit 1071 using a modulation scheme communicated in downlink control information, such as BPSK, QPSK, 16QAM, or 64QAM, or a modulation scheme determined in advance for each channel. The modulation unit 1073 determines the number of data sequences to be spatially multiplexed, on the basis of information used for scheduling of a PUSCH, maps, to a plurality of sequences, a plurality of pieces of uplink data to be transmitted on the same PUSCH using MIMO SM, and performs precoding on these sequences.

The uplink reference signal generation unit 1079 generates a sequence that is obtained on the basis of a predetermined rule by using a physical cell identity (referred to as a PCI or a Cell ID) used to identify the base station apparatus 3, a bandwidth in which an uplink reference signal is to be arranged, a cyclic shift communicated in an uplink grant, a value of a parameter for generation of a DMRS sequence, and the like. The multiplexing unit 1075 performs Discrete Fourier Transform (DFT) after rearranging modulation symbols of a PUSCH in parallel, in accordance with the control signal received from the control unit 103, and multiplexes the PUCCH and PUSCH signals and the generated uplink reference signal for each transmission antenna port.

The radio transmission unit 1077 performs Inverse Fast Fourier Transform (IFFT) on the multiplexed signal, performs modulation using an SC-FDMA scheme, adds guard intervals to the SC-FDMA modulated SC-FDMA symbols, generates a baseband digital signal, converts the baseband digital signal into an analog signal, generates an in-phase component and an orthogonal component having an intermediate frequency from the analog signal, removes an extra frequency component relative to the intermediate frequency band, converts (up-converts) the intermediate frequency signal to a high frequency signal, removes an extra frequency component, performs power amplification, and outputs the result to the transmission/reception antenna 109 for transmission.

Figure 3:
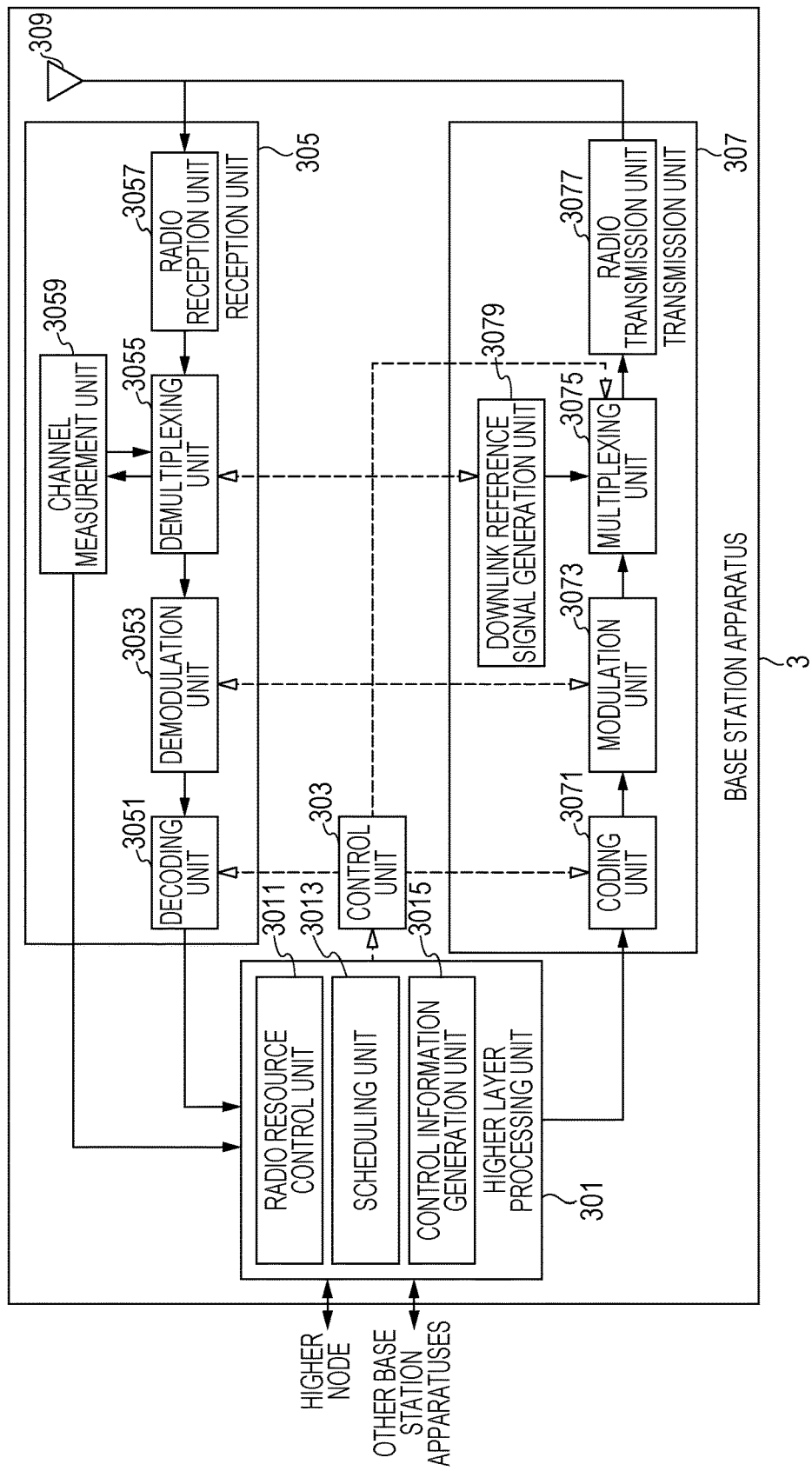
FIG. 3 is a block diagram schematically illustrating a configuration of a base station apparatus 3 of the present invention.

FIG. 3 is a block diagram schematically illustrating a configuration of the base station apparatus 3 of the present invention. As illustrated, the base station apparatus 3 includes a higher layer processing unit 301, a control unit 303, a reception unit 305, a transmission unit 307, and a transmission/reception antenna 309. The higher layer processing unit 301 includes a radio resource control unit 3011, a scheduling unit 3013, and a control information generation unit 3015. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. The higher layer processing unit 301 generates control information used to control the reception unit 305 and the transmission unit 307 and outputs the generated control information to the control unit 303.

The radio resource control unit 3011 included in the higher layer processing unit 301 generates or obtains from a higher node downlink data (a transport block) to be arranged on a downlink PDSCH, an RRC signal, and a MAC CE (Control Element), and outputs them to the transmission unit 307. The radio resource control unit 3011 manages various types of configuration information of each mobile station apparatus 1. For example, the radio resource control unit 3011 performs management of RNTIs, such as assignment of a C-RNTI to the mobile station apparatus 1, and management of parameters used for generation of a DMRS sequence for a PUSCH communicated to the mobile station apparatus 1.

The scheduling unit 3013 included in the higher layer processing unit 301 determines a frequency and a subframe to which a physical channel is assigned, the coding rate, modulation scheme, and transmission power of the physical channel, and the like from a channel estimation value and channel quality received from the channel measurement unit 3059. The scheduling unit 3013 generates control information used to control the reception unit 305 and the transmission unit 307, on the basis of the result of scheduling, and outputs the generated control information to the control unit 303. The scheduling unit 3013 outputs the result of scheduling of physical channels (PDSCH and PUSCH) to the control information generation unit 3015.

The control information generation unit 3015 generates information used for scheduling of physical channels (PDSCH and PUSCH), on the basis of the result of scheduling received from the scheduling unit 3013, and outputs the generated information to the transmission unit.

The control unit 303 generates a control signal used to control the reception unit 305 and the transmission unit 307, on the basis of the control information from the higher layer processing unit 301. The control unit 303 outputs the generated control signal to the reception unit 305 and the transmission unit 307 and controls the reception unit 305 and the transmission unit 307.

The reception unit 305 demultiplexes, demodulates, and decodes a reception signal received from the mobile station apparatus 1 via the transmission/reception antenna 309, in accordance with the control signal received from the control unit 303, and outputs the decoded information to the higher layer processing unit 301. The radio reception unit 3057 converts (down-converts) an uplink signal received via the transmission/reception antenna 309 into an intermediate frequency signal, removes an unnecessary frequency component, controls the amplification level so that the signal level is appropriately maintained, performs orthogonal demodulation on the basis of an in-phase component and an orthogonal component of the reception signal, and converts the analog signal on which orthogonal demodulation has been performed into a digital signal.

The radio reception unit 3057 removes, from the converted digital signal, portions corresponding to Guard Intervals (GIs). The radio reception unit 3057 performs Fast Fourier Transform (FFT) on the signal from which the guard intervals have been removed, extracts the signal in the frequency domain, and outputs the extracted signal to the demultiplexing unit 3055.

The demultiplexing unit 1055 demultiplexes the signal received from the radio reception unit 3057 into signals, such as a PUCCH, a PUSCH, an uplink reference signal, and the like. Not that this demultiplexing is performed on the basis of radio resource assignment information determined in advance by the base station apparatus 3 using the radio resource control unit 3011 and contained in an uplink grant communicated to each mobile station apparatus 1. The demultiplexing unit 3055 performs channel compensation for the PUCCH and PUSCH, from a channel estimation value received from the channel measurement unit 3059. Furthermore, the demultiplexing unit 3055 outputs the demultiplexed uplink reference signal to the channel measurement unit 3059.

The demodulation unit 3053 performs Inverse Discrete Fourier Transform (IDFT) on a PUSCH, obtains modulation symbols, and, for the modulation symbols of the PUCCH and PUSCH, demodulates the reception signal by using a modulation scheme determined in advance, such as BPSK (Binary Phase Shift Keying), QPSK, 16QAM, 64QAM, or the like, or a modulation scheme that the base station apparatus 3 has communicated in advance to each mobile station apparatus 1 in an uplink grant. The demodulation unit 3053 separates modulation symbols of a plurality of pieces of uplink data transmitted on the same PUSCH by using MIMO SM, on the basis of the number of sequences to be spatially multiplexed that has been communicated in advance to each mobile communication apparatus 1 in an uplink grant and information that specifies precoding to be performed on these sequences.

The decoding unit 3051 decodes coded bits of the demodulated PUSCH and PUSCH with a coding rate of a predetermined coding scheme which has been determined in advance or which has been communicated in advance by the base station apparatus 3 to the mobile station apparatus 1 in an uplink grant, and outputs the decoded uplink data and uplink control information to the higher layer processing unit 101. In the case of retransmission of a PUSCH, the decoding unit 3051 performs decoding by using coded bits received from the higher layer processing unit 301 and retained in an HARQ buffer and the coded bits that have been decoded. The channel measurement unit 309 measures the channel estimation value, channel quality, and the like from an uplink reference signal received from the demultiplexing unit 3055, and outputs the result to the demultiplexing unit 3055 and the higher layer processing unit 301.

The transmission unit 307 generates a downlink reference signal in accordance with the control signal received from the control unit 303, codes and modulates an HARQ indicator, downlink control information, and downlink data received from the higher layer processing unit 301, multiplexes the PHICH, PDCCH, and PDSCH, with the downlink reference signal, and transmits the result to the mobile station apparatus 1 via the transmission/reception antenna 309.

The coding unit 3071 codes the HARQ indicator, downlink control information, and downlink data received from the higher layer processing unit 301 using a coding scheme determined in advance, such as block coding, convolution coding, turbo coding, or the like, or a coding scheme determined by the radio resource control unit 3011. The modulation unit 3073 modulates coded bits received from the coding unit 3071 using a modulation scheme determined in advance, such as BPSK, QPSK, 16QAM, 64QAM, or the like, or a modulation scheme determined by the radio resource control unit 3011.

The downlink reference signal generation unit 3079 generates a sequence known to the mobile station apparatus 1 which is obtained in accordance with a rule determined in advance on the basis of a physical cell identity (PCI) used for identifying the base station apparatus 3, as a downlink reference signal. The multiplexing unit 3075 multiplexes modulation symbols of the channels that have been modulated and the generated downlink reference signal.

The radio transmission unit 3077 performs Inverse Fast Fourier Transform (IFFT) on the multiplexed modulation symbols and the like, performs modulation using an OFDM scheme, adds guard intervals to the OFDM-modulated OFDM symbols, generates a baseband digital signal, converts the baseband digital signal into an analog signal, generates an in-phase component and an orthogonal component having an intermediate frequency from the analog signal, removes an extra frequency component relative to the intermediate frequency band, converts (up-converts) the intermediate frequency signal to a high frequency signal, removes an extra frequency component, performs power amplification, and outputs the result to the transmission/reception antenna 309 for transmission.

Hereinafter, configurations of radio frames of the present invention will be described.

Figure 4:
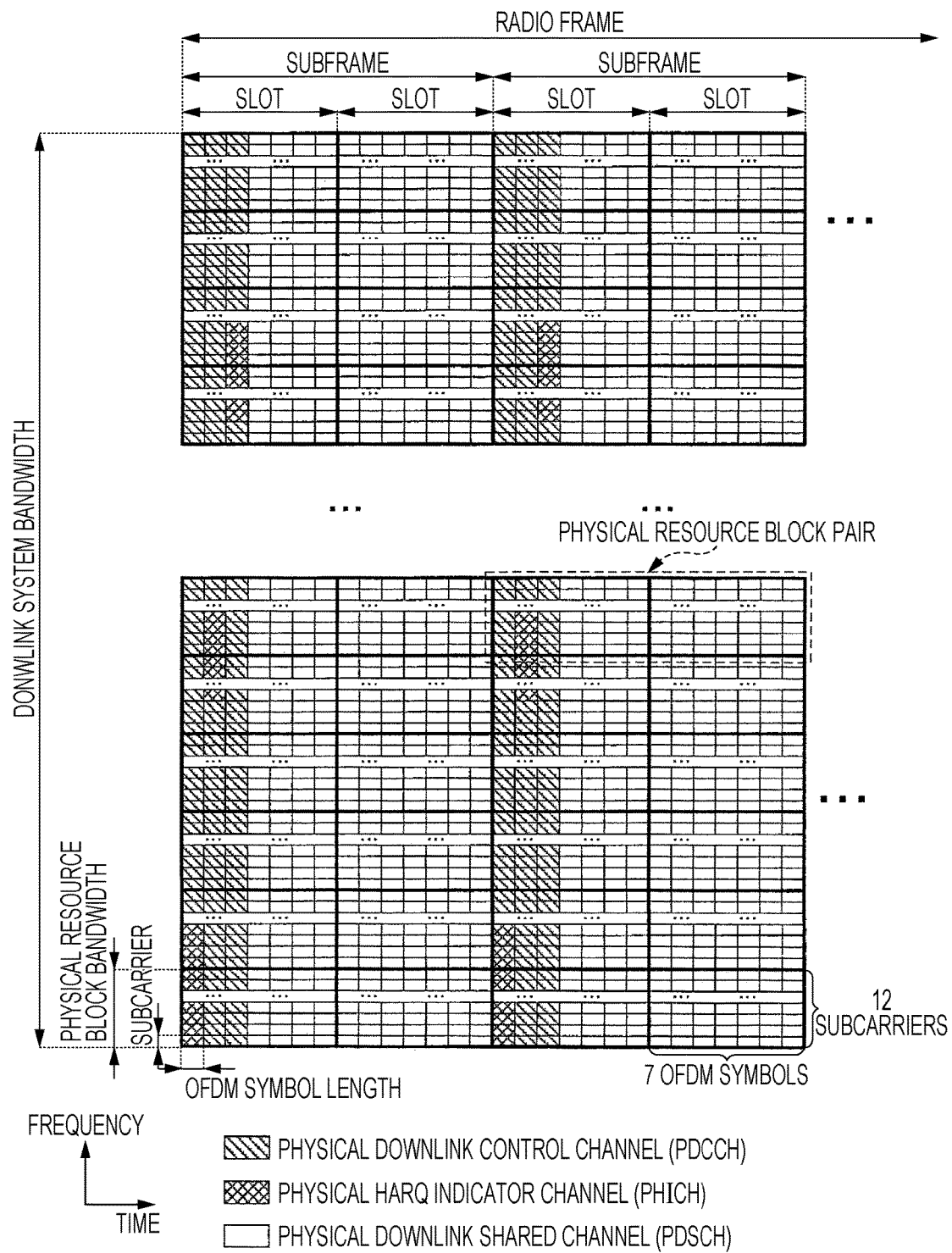
FIG. 4 is a diagram schematically illustrating an example of a configuration of a downlink radio frame of the present invention.

FIG. 4 is a diagram schematically illustrating an example of a configuration of a downlink radio frame of the present invention. In FIG. 4, the horizontal axis represents the time domain and the vertical axis represents the frequency domain. As illustrated in FIG. 4, a downlink radio frame is constituted by a plurality of pairs of downlink Physical Resource Blocks (PRBs) (for example, the region surrounded by a dashed line in FIG. 4). A pair of downlink physical resource blocks is a unit for radio resource assignment and the like and is constituted by a frequency band having a predetermined width (PRB bandwidth, 180 kHz) and a time frame (2 slots=1 subframe, 1 ms).

One pair of downlink physical resource blocks is constituted by two continuous downlink physical resource blocks (PRB bandwidth×slots) in the time domain. One downlink physical resource block (the unit surrounded by a thick line in FIG. 4) is constituted by 12 subcarriers (15 kHz) in the frequency domain, and is constituted by seven OFDM (Orthogonal Frequency Division Multiplexing) symbols (71 μs) in the time domain. One grid defined by one subcarrier in the frequency domain and one OFDM symbol in the time domain is called a downlink resource element. Accordingly, one downlink physical resource block is constituted by "12×7" downlink resource elements.

In the time domain, there are a slot (0.5 ms) constituted by seven OFDM symbols (71 μs), a subframe (1 ms) constituted by two slots, and a radio frame (10 ms) constituted by ten subframes. A time interval of 1 ms, which is equal to a subframe, is also called a Transmit Time Interval (TTI). In the frequency domain, a plurality of downlink physical resource blocks are arranged in accordance with the downlink bandwidth.

Hereinafter, arrangement of physical channels assigned to the downlink will be described. In each downlink subframe, a PDCCH, a PCFICH, a PHICH, a PDCCH, a downlink reference signal, and the like are arranged. PDCCHs are arranged in the first OFDM symbol and the following OFDM symbols in the subframe (in the region in FIG. 4 hatched with diagonal lines extending from the lower right to the upper left). The number of OFDM symbols in which PDCCHs are arranged differs depending on the subframe, and information indicating the number of OFDM symbols in which PDCCHs are arranged is broadcasted on a PCFICH. In each subframe, a plurality of PDCCHs are frequency-multiplexed and time-multiplexed.

A PCFICH is arranged in the first OFDM symbol of a subframe and is frequency-multiplexed with a PDCCH. A PHICH is frequency-multiplexed with a PDCCH in the same OFDM symbol (in the region in FIG. 4 hatched with diagonal grid lines). A PHICH may be arranged only in the first OFDM symbol in a subframe or PHICHs may be distributed and arranged in a plurality of OFDM symbols in which PDCCHs are arranged. In each subframe, a plurality of PHICHs are frequency-multiplexed and code-multiplexed.

The mobile station apparatus 1 receives, on a PHICH in a downlink subframe a certain period of time (for example, 4 ms, 4 subframes, or 4 TTIs) after transmitting a PUSCH, HARQ feedback for the PUSCH. A PHICH in a downlink subframe in which an HARQ indicator for a PUSCH is arranged is determined from the number of a physical resource block among physical resource blocks assigned to the PUSCH, the number being the smallest (the physical resource block being in the lowest frequency domain), and information contained in an uplink grant and used to determine a cyclic shift used for an uplink reference signal to be time-multiplexed with the PUSCH.

PDSCHs are arranged in OFDM symbols (in the non-hatched region in FIG. 4) other than the OFDM symbols, in a subframe, in which PDCCHs, PCFICHs, and PHICHs are arranged. A radio resource for a PDSCH is assigned using a downlink assignment. A radio resource for a PDSCH is arranged in the same downlink subframe in which a PDSCH containing a downlink assignment used for assignment of the PDSCH is arranged. In each subframe, a plurality of PDSCHs are frequency-multiplexed and spatially multiplexed. Downlink reference signals are not illustrated in FIG. 4 in order to simplify description. Downlink reference signals are distributed and arranged in the frequency domain and in the time domain.

Figure 5:
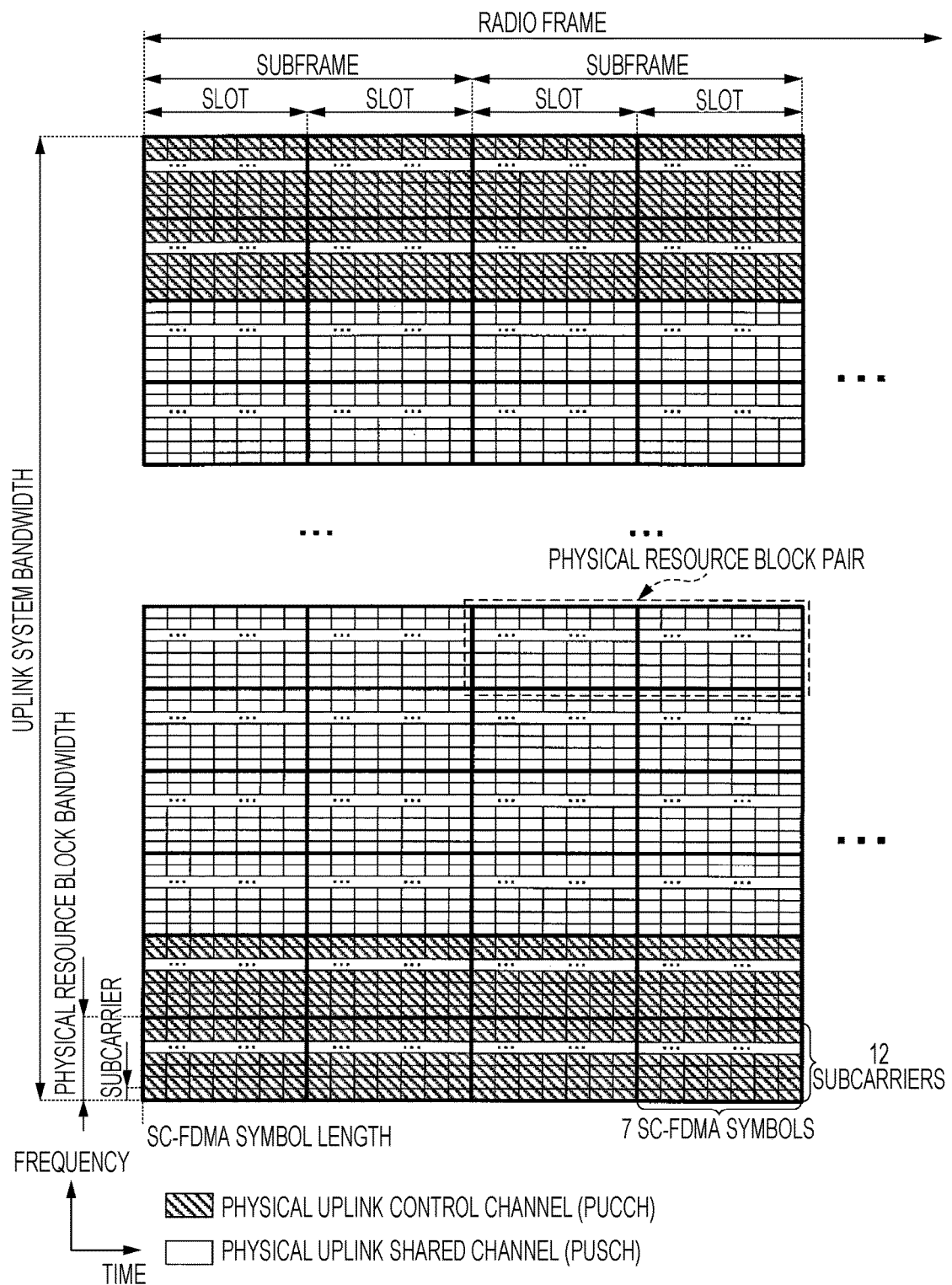
FIG. 5 is a diagram schematically illustrating an example of a configuration of an uplink radio frame of the present invention.

FIG. 5 is a diagram schematically illustrating an example of a configuration of an uplink radio frame of the present invention. In FIG. 5, the horizontal axis represents the time domain and the vertical axis represents the frequency domain. As illustrated in FIG. 5, an uplink radio frame is constituted by a plurality of pairs of uplink physical resource blocks (for example, the region surrounded by a dashed line in FIG. 5). A pair of uplink physical resource blocks is a unit for radio resource assignment and the like and is constituted by a frequency band having a predetermined width (PRB bandwidth, 180 kHz) and a time frame (2 slots=1 subframe, 1 ms).

One pair of uplink physical resource blocks is constituted by two continuous uplink physical resource blocks (PRB bandwidth×slots) in the time domain. One uplink physical resource block (the unit surrounded by a thick line in FIG. 5) is constituted by 12 subcarriers (15 kHz) in the frequency domain, and is constituted by seven SC-FDMA symbols (71 μs) in the time domain. One grid defined by one subcarrier in the frequency domain and one SC-FDMA symbol in the time domain is called an uplink resource element. Accordingly, one uplink physical resource block is constituted by "12×7" uplink resource elements.

In the time domain, there are a slot (0.5 ms) constituted by seven SC-FDMA (Single-Carrier Frequency Division Multiple Access) symbols (71 μs), a subframe (1 ms) constituted by two slots, and a radio frame (10 ms) constituted by ten subframes. A time interval of 1 ms, which is equal to a subframe, is also called a Transmit Time Interval (TTI). In the frequency domain, a plurality of uplink physical resource blocks are arranged in accordance with the uplink bandwidth.

Hereinafter, arrangement of physical channels assigned to the uplink radio frames will be described. In each uplink subframe, a PUCCH, a PUSCH, a PRACH, an uplink reference signal, and the like are arranged. PUCCHs are arranged in uplink physical resource blocks positioned at both ends of the uplink bandwidth (in the region hatched with diagonal lines extending from the lower right to the upper left). In each subframe, a plurality of PUCCHs are frequency-multiplexed and code-multiplexed.

PUCCHs are arranged in pairs of uplink physical resource blocks (in the non-hatched region) other than the uplink physical resource blocks in which PUCCHs are arranged. A radio resource for a PUSCH is assigned using an uplink grant and is arranged in an uplink subframe a certain period of time (for example, 4 ms, 4 subframes, or 4 TTIs) after a downlink subframe in which a PDCCH containing the uplink grant is arranged. In each subframe, a plurality of PUCCHs are frequency-multiplexed and spatially multiplexed.

Information indicating a subframe and an uplink physical resource block in which a PRACH is arranged is broadcasted by the base station apparatus. An uplink reference signal is time-multiplexed with a PUCCH or a PUSCH. For example, a DMRS to be time-multiplexed with a PUSCH is arranged in the 4th and 11th SC-FDMA symbols in a subframe.

Hereinafter, a method of transmitting DMRSs according to the present invention will be described.

Figure 6:
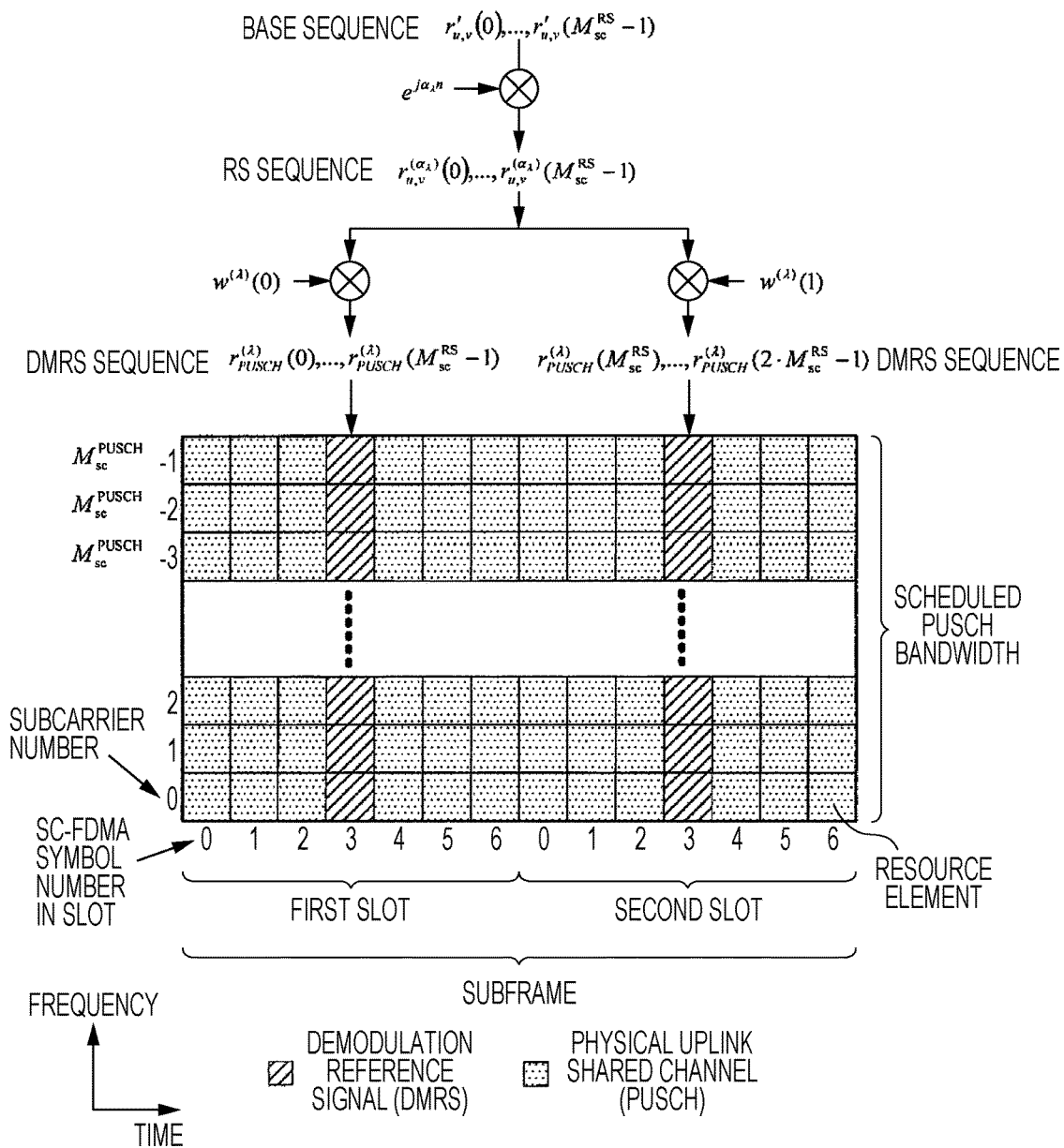
FIG. 6 is a diagram illustrating an example of a method of mapping PUSCHs and DMRSs to physical resources in the present invention.

FIG. 6 is a diagram illustrating an example of a method of mapping PUSCHs and DMRSs to physical resources in the present invention. In FIG. 6, the horizontal axis represents the time domain and the vertical axis represents the frequency domain. $M^{PUSCH}_{SC}$ is the number of subcarriers contained in a bandwidth scheduled for transmission of PUSCHs. In FIG. 6, the squares hatched with diagonal lines extending from the upper left to the lower right represent resource elements to which a DMRS sequence is mapped. The squares hatched with dots represent resource elements to which modulation symbols (complex symbols) of PUSCHs are mapped. In FIG. 6, one subframe is illustrated in the time domain.

As illustrated in FIG. 6, a DMRS sequence $r^{(\lambda)}_{PUSCH}(\cdot)$ for a PUSCH is mapped to the same physical resource block (resource elements) in the frequency domain, which is used for transmission of the corresponding PUSCH. The DMRS sequence $r^{(\lambda)}_{PUSCH}(\cdot)$ for a PUSCH is mapped to the 3rd SC-FDMA symbol in each slot in the time domain. That is, the mobile station apparatus 1 time-multiplexes and transmits a PUSCH and a DMRS sequence for the PUSCH. More specifically, the mobile station apparatus 1 time-multiplexes and transmits SC-FDMA symbols for a PUSCH and SC-FDMA symbols for a DMRS sequence. $\lambda$ is the number of a layer to be spatially multiplexed in a single PUSCH. That is, the DMRS sequence $r^{(\lambda)}_{PUSCH}(\cdot)$ for a PUSCH is generated for each layer to be spatially multiplexed. The DMRS sequence $r^{(\lambda)}_{PUSCH}(\cdot)$ for a PUSCH is generated by multiplying an RS (reference signal) sequence $r^{(\alpha\lambda)}_{u,v}(\bullet)$ by an OCC[$w^{(\lambda)}(0)$, $w^{(\lambda)}(1)$]. The RS sequence $r^{(\alpha\lambda)}_{u,v}(\bullet)$ is generated by multiplying a base sequence $r'_{u,v}(\bullet)$ by a cyclic shift $e^{j\alpha\lambda n}$.

Hereinafter, a method of generating DMRSs according to the present invention will be described.

The DMRS sequence $r^{(\lambda)}_{PUSCH}(\bullet)$ for a PUSCH relating to a layer $\lambda$ is defined by expression (1). $M^{RS}_{SC}$ is the length of a DMRS sequence. $M^{RS}_{SC}$ is equal to $M^{PUSCH}_{SC}$.

[Math. 1]

$$r_{PUSCH}^{(\lambda)}(m \cdot M_{sc}^{RS}+n)=w^{(\lambda)}(m)r_{u,v}^{(\alpha\lambda)}(n),\ m=0,1\ 0\le n<M_{sc}^{RS} \quad (1)$$

An RS sequence $r^{(\alpha\lambda)}_{u,v}(n)$ relating to a layer $\lambda$ is defined in accordance with expression (2) on the basis of the base sequence $r'_{u,v}(\bullet)$ and a cyclic shift $\alpha$. Depending on $\alpha 0$ having different values, a plurality of RS sequences are defined from a single base sequence. $\alpha_\lambda$ corresponding to each layer $\lambda$ of the same mobile station apparatus 1 has different values.

[Math. 2]

$$r_{u,v}^{(\alpha\lambda)}(n)=e^{j\alpha\lambda n}r'_{u,v}(n),\ 0\le n<M_{sc}^{RS} \quad (2)$$

A base sequence $r'_{u,v}(n)$ is divided into a plurality of groups. u is a sequence group number and v is a base sequence number in each of the groups. If the length of a base sequence is equal to or less than 60, the groups each include one base sequence (v=0). If the length of a base sequence is equal to or more than 61, the groups each include two base sequences (v=0, 1). The sequence group number u and the base sequence number v can be varied from time to time using sequence group hopping and sequence hopping. The details of sequence group hopping and sequence hopping will be described below. The definition of a base sequence $r'_{u,v}(0), \ldots, r'_{u,v}(M^{RS}_{SC}-1)$ is determined in accordance with $M^{RS}_{SC}$, which is the length of the DMRS sequence.

If the length of a DMRS sequence is equal to or more than 36, the base sequence $r'_{u,v}(\bullet)$ is defined by expression (3).

[Math. 3]

$$r'_{u,v}(n)=x_q(n\bmod N_{ZC}^{RS}),\ 0\le n<M_{sc}^{RS} \quad (3)$$

$x_q(\bullet)$ represents the q-th root Zadoff-Chu sequence and defined by expression (4). $N^{RS}_{ZC}$ is the length of the Zadoff-Chu sequence. The length $N^{RS}_{ZC}$ of the Zadoff-Chu sequence is the maximum prime number that is smaller than $M^{RS}_{SC}$, which is the length of the DMRS sequence. [X] mod [Y] is a function used to calculate the remainder obtained when [X] is divided by [Y].

[Math. 4]

$$x_q(m)=e^{-j\frac{\pi qm(m+1)}{N_{ZC}^{RS}}},\ 0\le m\le N_{ZC}^{RS}-1 \quad (4)$$

q is calculated in accordance with expressions (5) and (6) using the sequence group number u and the base sequence number v in the group. floor(X) is a function used to output the maximum integer that is equal to or less than X.

[Math. 5]

$$q=\text{floor}(\bar{q}+\tfrac{1}{2})+v\cdot(-1)^{\text{floor}(2\bar{q})} \quad (5)$$

[Math. 6]

$$\bar{q}=N_{ZC}^{RS}\cdot(u+1)/31 \quad (6)$$

If the length of a DMRS sequence is 12 or 24, the base sequence $r'_{u,v}(\bullet)$ is defined by expression (7). $\phi(\bullet)$ is defined in accordance with the table in FIG. 7 for a DMRS sequence having the length of 12 and the table in FIG. 8 for a DMRS sequence having the length of 24.

[Math. 7]

$$r'_{u,v}(n)=e^{j\phi(n)\pi/4},\ 0\le n\le M_{sc}^{RS}-1 \quad (7)$$

In the case where a plurality of DMRS sequences are generated from the same sequence group number and base sequence number, have the same length, and are transmitted in the same band, the plurality of DMRS sequences become orthogonal to each other by using different cyclic shifts. In the case where a plurality of DMRS sequences are generated from different combinations of a sequence group number and a base sequence number, a plurality of DMRS sequences have different lengths, or a plurality of DMRS sequences are transmitted in partially overlapping bands, the plurality of DMRS sequences do not become orthogonal to each other even if different cyclic shifts are used.

In the case where a plurality of DMRS sequences are generated from different combinations of a sequence group number and a base sequence number, the cross-correlation between the plurality of DMRS sequences becomes low compared with the case where a plurality of DMRS sequences are generated from the same sequence group number and base sequence number.

Regardless of the sequence group numbers and base sequence numbers of DMRS sequences and regardless of whether or not bands in which DMRS sequences are transmitted overlap, a plurality of DMRS sequences become orthogonal to each other by using different OCCs. However, the orthogonality between DMRS sequences obtained by using OCCs may be lost due to a Doppler frequency generated as a result of movement of the mobile station apparatus 1.

Accordingly, in the case where a plurality of DMRS sequences made orthogonal to each other using different OCCs are generated from the same sequence group number and base sequence number, have the same length, and are transmitted in the same band, it is preferable that different cyclic shifts be used for the plurality of DMRS sequences. In this way, even if the orthogonality between DMRS sequences obtained by using OCCs is lost due to a Doppler frequency generated as a result of movement of the mobile station apparatus 1, the orthogonality between the DMRS sequences can be restored by using cyclic shifts.

In the case where a plurality of DMRS sequences made orthogonal to each other using different OCCs are generated from different combinations of a sequence group number and a base sequence number, even if the orthogonality between the DMRS sequences obtained by using OCCs is lost due to a Doppler frequency generated as a result of movement of the mobile station apparatus 1, the cross-correlation between the plurality of DMRS sequences becomes low compared with the case where a plurality of DMRS sequences are generated from the same sequence group number and base sequence number.

Hereinafter, sequence group hopping of the present invention will be described.

The sequence group number in a slot $n_s$ is defined in accordance with expression (8) on the basis of a group hopping pattern $f_{gh}(n_s)$, a sequence shift pattern $f_{ss}$, a UE-specific parameter $f^{(1)}_{DMRS}$ determined from information transmitted on a PDCCH, and a UE-specific parameter $f^{(2)}_{DMRS}$ set by a higher layer.

[Math. 8]

$$u=(f_{gh}(n_s)+f_{ss}+f_{DMRS}^{(1)}+f_{DMRS}^{(2)})\bmod 30 \qquad (8)$$

The mobile station apparatus 1 determines whether sequence group hopping is enabled or disabled in accordance with a cell-specific parameter Group-hopping-enabled given by a higher layer. Even if sequence group hopping is enabled in accordance with Group-hopping-enabled, the mobile station apparatus 1 can disable sequence group hopping on a PUSCH in accordance with a UE-specific parameter Disable-sequence-group-hopping given by a higher layer. The group hopping pattern $f_{gh}(n_s)$ is defined by expression (9).

[Math. 9]

$$f_{gh}(n_s) = \begin{cases} 0 & \text{if group hopping is disabled} \\ \left(\sum_{i=0}^{7} c(8n_s+i)\cdot 2^i\right)\bmod 30 & \text{if group hopping is enabled} \end{cases} \qquad (9)$$

c(•) is a Pseudo-random sequence. A pseudo-random sequence is defined by a gold sequence having a length of 31. The pseudo-random sequence c(•) of the group hopping pattern $f_{gh}(n_s)$ is initialized at the start of each radio frame with $c_{init}$ calculated using expression (10). $N^{cell}_{ID}$ is a physical cell identity. A method of generating a pseudo-random sequence will be described below.

[Math. 10]

$$c_{init} = \text{floor}\left(\frac{N_{ID}^{cell}}{30}\right) \qquad (10)$$

The definition of the sequence shift pattern $f_{ss}$ for a PUSCH is different from the definition for a PUCCH. The sequence shift pattern $f_{ss}$ for a PUCCH is given by expression (11).

[Math. 11]

$$f_{ss}^{PUCCH}=N_{ID}^{cell}\bmod 30 \qquad (11)$$

For a PUSCH, the sequence shift pattern $f_{ss}$ is given by expression (12). $\Delta_{ss}$ is a cell-specific parameter set by a higher layer and is an integer within the range from 0 to 29.

[Math. 12]

$$f_{ss}^{PUSCH}=(f_{ss}^{PUCCH}+\Delta_{ss})\bmod 30 \qquad (12)$$

Information regarding the parameter $f^{(1)}_{DMRS}$ is transmitted from the base station apparatus 3 to the mobile station apparatus 1 by using an uplink grant (DCI format 0 and/or DCI format 4) that is used for scheduling of a PUSCH. Note that information indicating a parameter relating to a cyclic shift for a DMRS and a parameter relating to $f^{(1)}_{DMRS}$ may be transmitted by using an uplink grant (DCI format 0 and/or DCI format 4). Information regarding the parameter $f^{(2)}_{DMRS}$ is transmitted from the base station apparatus 3 to the mobile station apparatus 1 as a message of a higher layer (radio resource control layer) by using a PDSCH. Between the base station apparatuses 3 (cells, points), information indicating $f^{(1)}_{DMRS}$ and $f^{(2)}_{DMRS}$ selected by the base station apparatus 3 is communicated to an adjacent base station apparatus 3 (cell, point). In this way, the base station apparatus 3 can perform interference coordination for DMRSs with an adjacent base station apparatus 3 (cell, point) by appropriately selecting $f^{(1)}_{DMRS}$ and $f^{(2)}_{DMRS}$ in accordance with the information communicated to the base station apparatus 3 from an adjacent cell, scheduling of a PUSCH for the mobile station apparatus 1, and the like.

Note that expressions (13) and (14) may be used instead of expressions (8) and (11). Expressions (13) and (15) may be used instead of expressions (8) and (12).

[Math. 13]

$$u=(f_{gh}(n_s)+f_{ss})\bmod 30 \qquad (13)$$

[Math. 14]

$$f_{ss}^{PUCCH}=(N_{ID}^{cell}+f_{DMRS}^{(1)}+f_{DMRS}^{(2)})\bmod 30 \qquad (14)$$

[Math. 15]

$$f_{ss}^{PUSCH}=(f_{ss}^{PUCCH}+\Delta_{ss}+f_{DMRS}^{(1)}+f_{DMRS}^{(2)})\bmod 30 \qquad (15)$$

In the case where expressions (13) and (14) are used instead of expressions (8) and (11), the sequence group numbers of DMRS sequences for a PUCCH and a PUSCH are calculated on the basis of $f^{(1)}_{DMRS}$ and $f^{(2)}_{DMRS}$. In the case where expressions (13) and (15) are used instead of expressions (8) and (12), the sequence group number of a DMRS sequence for a PUSCH is calculated on the basis of $f^{(1)}_{DMRS}$ and $f^{(2)}_{DMRS}$.

Hereinafter, sequence hopping of the present invention will be described.

Sequence hopping is applied to a DMRS sequence having a length of 72 or more. For a DMRS sequence having a length of less than 72, the base sequence number v in a base sequence group in the slot $n_s$ is 0. For a DMRS sequence having a length of 72 or more, the base sequence number v in a base sequence group in the slot $n_s$ is defined in accordance with expression (16) on the basis of the pseudo random sequence c(~), a UE-specific parameter $f^{(1)}_{SH}$ determined from information transmitted on a PDCCH, and a UE-specific parameter $f^{(2)}_{SH}$ set by a higher layer.

[Math. 16]

$$v = \begin{cases} c(n_s) + f_{SH}^{(1)} + f_{SH}^{(2)} & \text{if group hopping is disabled and sequence hopping is enabled} \\ f_{SH}^{(1)} + f_{SH}^{(2)} & \text{otherwise} \end{cases} \qquad (16)$$

The mobile station apparatus 1 determines whether sequence hopping is enabled or disabled in accordance with a cell-specific parameter Sequence-hopping-enabled given by a higher layer. Even if sequence group hopping is enabled in accordance with Sequence-hopping-enabled, the mobile station apparatus 1 can disable sequence hopping on a PUSCH in accordance with a UE-specific parameter Disable-sequence-group-hopping given by a higher layer.

The pseudo-random sequence c(•) of a base sequence number is initialized at the start of each radio frame with $c_{init}$ calculated using expression (17).

[Math. 17]

$$c_{init} = \text{floor}\left(\frac{N_{ID}^{cell}}{30}\right) \cdot 2^5 + f_{ss}^{PUSCH} \qquad (17)$$

Information regarding the parameter $f^{(1)}{}_{SH}$ is transmitted from the base station apparatus 3 to the mobile station apparatus 1 by using an uplink grant (DCI format 0 and/or DCI format 4) that is used for scheduling of a PUSCH. Note that information indicating $f^{(1)}{}_{SH}$ and at least one of a parameter relating to a cyclic shift for a DMRS and a parameter relating to $f^{(1)}{}_{DMRS}$ may be transmitted by using an uplink grant (DCI format 0 and/or DCI format 4).

Information regarding the parameter $f^{(2)}{}_{SH}$ is transmitted from the base station apparatus 3 to the mobile station apparatus 1 as a message of a higher layer (radio resource control layer) by using a PDSCH. Between the base station apparatuses 3 (cells, points), information indicating $f^{(1)}{}_{SH}$ and $f^{(2)}{}_{SH}$ selected by the base station apparatus 3 is communicated to an adjacent base station apparatus 3 (cell, point). In this way, the base station apparatus 3 can perform interference coordination for DMRSs with an adjacent base station apparatus 3 (cell, point) by appropriately selecting $f^{(1)}{}_{SH}$ and $f^{(2)}{}_{SH}$ in accordance with the information communicated to the base station apparatus 3 from an adjacent cell, scheduling of a PUSCH for the mobile station apparatus 1, and the like.

Orthogonality obtained by using a cyclic shift can be applied because a PUCCH is always mapped to one physical resource block and the length of a DMRS sequence for a PUCCH is constant. Therefore, when calculating the sequence group number for a PUCCH, $f^{(1)}{}_{DMRS}$ and $f^{(2)}{}_{DMRS}$ may be set to 0 in expressions (8) and (14) and $f^{(1)}{}_{SH}$ and $f^{(2)}{}_{SH}$ may be set to 0 in expression (16). Note that the default values of $f^{(1)}{}_{DMRS}$, $f^{(2)}{}_{DMRS}$, $f^{(1)}{}_{SH}$, and $f^{(2)}{}_{SH}$ are 0. Furthermore, $f^{(1)}{}_{DMRS}$ and $f^{(2)}{}_{DMRS}$ are integers within the range from 0 to 29, and $f^{(1)}{}_{SH}$ and $f^{(2)}{}_{SH}$ are integers that are 0 or 1.

In expressions (8), (14), and (15), either one of $f^{(1)}{}_{DMRS}$ and $f^{(2)}{}_{DMRS}$ may be used. In expression (16), either one of $f^{(1)}{}_{SH}$ and $f^{(2)}{}_{SH}$ may be used. In expressions (8), (14), (15), and (16), at least one of $f^{(1)}{}_{DMRS}$, $f^{(2)}{}_{DMRS}$, $f^{(1)}{}_{SH}$, and $f^{(2)}{}_{SH}$ may be used. That is, the mobile station apparatus 1 may determine either one of the sequence group number u and the base sequence number v by using the UE-specific parameters.

The values of $f^{(1)}{}_{DMRS}$ and $f^{(1)}{}_{SH}$ are transmitted from the base station apparatus 3 to the mobile station apparatus 1 by using an uplink grant (DCI format 0 and/or DCI format 4) and therefore can be dynamically changed for each subframe. However, this will increase overheads caused by signals transmitted from the base station apparatus 3 to the mobile station apparatus 1. The values of $f^{(2)}{}_{DMRS}$ and $f^{(2)}{}_{SH}$ are transmitted from the base station apparatus 3 to the mobile station apparatus 1 as a message of a higher layer by using a PDSCH and therefore cannot be dynamically changed for each subframe. However, this will result in less overheads caused by signals transmitted from the base station apparatus 3 to the mobile station apparatus 1 compared with the method of communicating the values of $f^{(1)}{}_{DMRS}$ and $f^{(1)}{}_{SH}$ by using an uplink grant (DCI format 0 and/or DCI format 4).

Hereinafter, a method of generating the pseudo-random sequence c(·) will be described. An output sequence c(n) (n=0, 1, . . . , $M_{PN}$−1) having a length $M_{PN}$ is defined by expression (18).

[Math. 18]

$$c(n) = (x_1(n+N_C) + x_2(n+N_C)) \bmod 2 \qquad (18)$$

$N_C$ is equal to 1600. The first m sequence $x_1$ is initialized such that $x_1(0)=1$ and $x_1(n)=1$ (n=1, 2, . . . 30). The second m sequence $x_2$ is initialized by using expression (19). The mobile station apparatus 1 uses a value of $x_2$ that satisfies expression (19) as the initial value of $x_2$.

[Math. 19]

$$c_{init} = \sum_{i=0}^{30} x_2(i) \cdot 2^i \qquad (19)$$

The mobile station apparatus 1 calculates the values of $x_1$ and $x_2$ when the value of n is equal to or more than 31 by using expressions (20) and (21).

[Math. 20]

$$x_1(n+31) = (x_1(n+3) + x_1(n)) \bmod 2 \qquad (20)$$

[Math. 21]

$$x_2(n+31) = (x_2(n+3) + x_2(n+2) + x_2(n+1) + x_2(n)) \bmod 2 \qquad (21)$$

Hereinafter, random access of the present invention will be described.

Random access has two access methods, that is, Contention based Random Access and Non-contention based Random Access. Contention based Random Access is an access method having a possibility of contention occurring between the mobile station apparatuses 1, and is random access that is usually performed. Non-contention based Random Access is an access method in which contention does not occur between the mobile station apparatuses 1, and is random access performed at the initiative of the base station apparatus 3 in a special case, such as handover, in order to promptly establish synchronization between the mobile station apparatus 1 and the base station apparatus 3.

Hereinafter, Contention based Random Access of the present invention will be described. Description of Non-contention based Random Access will be omitted here.

In random access, in order to establish synchronization, the mobile station apparatus 1 transmits only a preamble. A preamble includes a signature, which is a signal pattern representing information, can provide several tens of types of signatures, and can represent information of several bits. The mobile station apparatus 1 transmits 6-bit information using a preamble and therefore 64 types of signatures are provided.

When receiving a preamble transmitted by the mobile station apparatus 1, the base station apparatus 3 calculates from the preamble a time lag in synchronization timing between the mobile station apparatus 1 and the base station apparatus 3, and performs scheduling for the mobile station apparatus 1 to transmit a message 3. The base station apparatus 3 thereafter assigns a Temporary C-RNTI to the mobile station apparatus 1 that has transmitted the preamble, arranges an RA-RNTI (Random Access-Radio Network Temporary Identifier) corresponding to a PRACH on which the preamble has been received by including the RA-RNTI in a PDCCH, and transmits, to a PDSCH indicated by radio resource assignment included in the PDCCH, a random access response (message 2) that contains information regarding a time lag in synchronization timing, scheduling information on a PUSCH, the Temporary C-RNTI, and the number (also referred to as the random ID or preamble ID) of a signature in the received preamble. Scheduling information on a PUSCH contained in a random access response is called a random access response grant.

When confirming that an RA-RNTI is contained in a detected PDCCH, the mobile station apparatus 1 confirms the contents of a random access response arranged in a PDSCH indicated by radio resource assignment contained in the PDCCH. The mobile station apparatus 1 extracts a response that includes the number of a signature in the preamble that the mobile station apparatus 1 has transmitted, corrects a time lag in synchronization timing, and transmits a message 3 that contains a radio resource of a PUSCH that has been assigned and a C-RNTI communicated in advance from the base station apparatus 3 in a transmission format, a connection request message (RRCConnectionRequest message), or a connection reestablishment request message (RRCConnectionReestablishmentRequest message).

When receiving a message 3 from the mobile station apparatus 1, the base station apparatus 3 transmits, to the mobile station apparatus 1, a contention resolution (message 4) that contains a C-RNTI contained in the received message 3, or information contained in the connection request message or in the connection reestablishment request message and used to identify the mobile station apparatus 1.

When failing to decode a message 3, the base station apparatus 3 instructs the mobile station apparatus 1 to retransmit the message 3 by using DCI format 0 that contains a Temporary C-RNTI to which the message 3 decoding of which failed corresponds, or an HARQ indicator that indicates NACK. When the mobile station apparatus 1 is instructed to retransmit a message 3 by an HARQ indicator that indicates NACK, the mobile station apparatus 1 retransmits the message 3 in accordance with information (a random access response grant and/or DCI format 0) that is used for scheduling of a PUSCH for the message 3 and that has been received lately.

Figure 9:
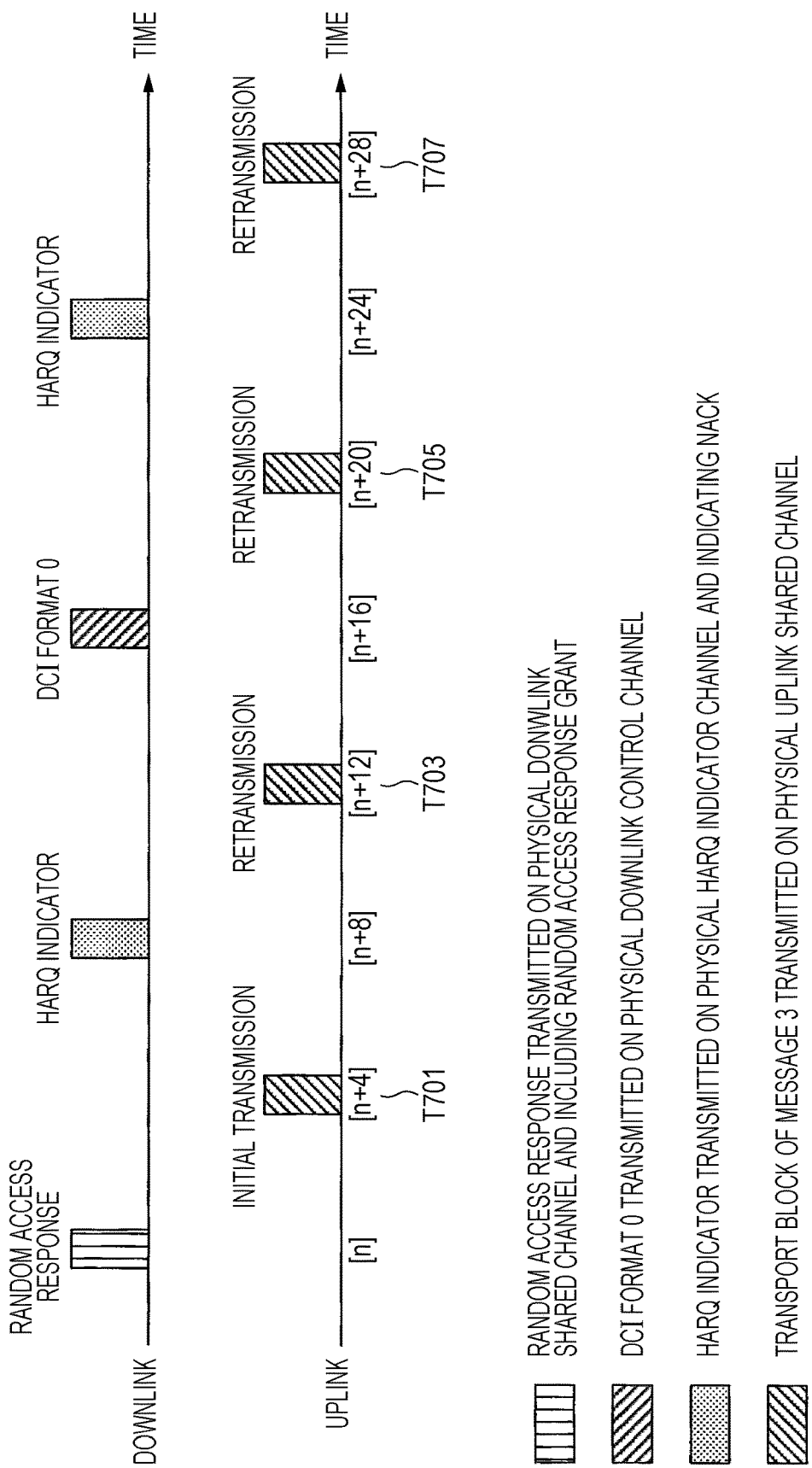
FIG. 9 is a diagram illustrating an example of a procedure of initial transmission and retransmission of a message 3 in the present invention.

FIG. 9 is a diagram illustrating an example of a procedure of initial transmission and retransmission of a message 3 in the present invention. In FIG. 9, the horizontal axis represents the time domain, the rectangle hatched with vertical lines represents a random access response transmitted on a PDSCH and containing a random access response grant, the rectangles hatched with dots each represent an HARQ indicator transmitted on a PHICH and indicating NACK, the rectangle hatched with diagonal lines extending from the upper right to the lower left represents DCI format 0 transmitted on a PDCCH, containing a Temporary C-RNTI, and giving an instruction to retransmit a message 3, the rectangles hatched with diagonal lines extending from the lower right to the upper left each represent a transport block of a message 3 transmitted on a PUCCH, and the numbers enclosed by square brackets each represent the subframe number.

In FIG. 9, in a subframe n, the mobile station apparatus 1 receives a random access response containing a random access response grant. In a subframe n+4, the mobile station apparatus 1 initially transmits, on a PUSCH, a transport block of a message 3 in accordance with the random access response grant contained in the random access response received in the subframe n (T701). In a subframe n+8, the mobile station apparatus 1 receives an HARQ indicator for the transport block corresponding to the PUSCH on which initial transmission has been performed in the subframe n+4. In the case where the HARQ indicator received in the subframe n+8 indicates NACK, the mobile station apparatus 1 retransmits, in a subframe n+12, the same transport block of the message 3 corresponding to the PUSCH on which initial transmission has been performed in the subframe n+4, in accordance with the random access response grant contained in the random access response received in the subframe n (T703).

In a subframe n+16, the mobile station apparatus 1 receives DCI format 0 that gives an instruction to retransmit the transport block corresponding to the PUSCH on which initial transmission has been performed in the subframe n+4. In a subframe n+20, the mobile station apparatus 1 retransmits the same transport block of the message 3 corresponding to the PUSCH on which initial transmission has been performed in the subframe n+4, in accordance with DCI format 0 received in the subframe n+16 (T705). In a subframe n+24, the mobile station apparatus 1 receives an HARQ indicator for the transport block corresponding to the PUSCH on which initial transmission has been performed in the subframe n+4. In the case where the HARQ indicator received in the subframe n+24 indicates NACK, the mobile station apparatus 1 retransmits, in a subframe n+28, the same transport block of the message 3 corresponding to the PUSCH on which initial transmission has been performed in the subframe n+4, in accordance with DCI format 0 received in the subframe n+16 (T707).

The base station apparatus 3 does not know the mobile station apparatus 1 that has performed transmission of a PUSCH scheduled in accordance with a random access response grant as part of Contention based Random Access, and transmission of a PUSCH for the same transport block that has been transmitted on that PUSCH. That is, the base station apparatus 3 does not know the mobile station apparatus 1 that has performed initial transmission and retransmission of a message 3 as part of Contention based Random Access.

Accordingly, when the mobile station apparatus 1 performs initial transmission and retransmission of a message 3 as part of Contention based Random Access, in the case where the mobile station apparatus 1 determines at least one of the sequence group number u and the base sequence number v of a DMRS sequence by using at least one Of $f^{(1)}_{DMRS}$, $f^{(2)}_{DMRS}$, $f^{(1)}_{SH}$, and $f^{(2)}_{SH}$, which are UE-specific parameters, the base station apparatus 3 cannot know the sequence group number u and the base sequence number v of the DMRS sequence to be transmitted by the mobile station apparatus 1. As a result, the base station apparatus 3 cannot perform channel estimation from the DMRS for a PUSCH corresponding to transmission of the message 3, which is a problem in that channel compensation for the PUSCH cannot be performed.

Accordingly, in the present invention, even if the mobile station apparatus 1 has been communicated from the base station apparatus 3 at least one of $f^{(1)}_{DMRS}$, $f^{(2)}_{DMRS}$, $f^{(1)}_{SH}$, and $f^{(2)}_{SH}$, which are UE-specific parameters, when the mobile station apparatus 1 performs initial transmission and retransmission of a message 3 on a PUSCH as part of Contention based Random Access, the mobile station apparatus 1 determines the sequence group number u and the base sequence number v of a DMRS sequence for a PUSCH by setting $f^{(1)}_{DMRS}$, $f^{(2)}_{DMRS}$, $f^{(1)}_{SH}$, and $f^{(2)}_{SH}$ to 0.

That is, when the mobile station apparatus 1 has received information relating to the parameters ($f^{(1)}_{DMRS}$, $f^{(2)}_{DMRS}$, $f^{(1)}_{SH}$, and $f^{(2)}_{SH}$) used for generation of a DMRS sequence for a PUSCH, on a physical downlink channel (PDCCH or PDSCH), and in the case where the mobile station apparatus 1 performs transmission of a transport block on a PUSCH regardless of Contention based Random Access, the mobile station apparatus 1 determines the values of the parameters by using the information relating to the parameters. In the case where the mobile station apparatus 1 performs transmission of a transport block by using a physical uplink shared channel as part of Contention based Random Access, the mobile station apparatus 1 sets the values of the parameters to 0. Then, the mobile station apparatus 1 generates the DMRS sequence by using the values of the parameters.

More specifically, when the mobile station apparatus 1 has received information relating to the parameters ($f^{(1)}_{DMRS}$, $f^{(2)}_{DMRS}$, $f^{(1)}_{SH}$, and $f^{(2)}_{SH}$) used for generation of a DMRS sequence for a PUSCH, on a physical downlink channel (PDCCH or PDSCH), and has received downlink control information (DCI format 0 and/or DCI format 4) used for scheduling of the PUSCH, and in the case where a temporary C-RNTI has been used for transmission of downlink control information received lately, for a transport block corresponding to transmission of the PUSCH, the mobile station apparatus 1 sets the values of the parameters to 0. In the case where a C-RNTI has been used for transmission of downlink control information received lately, for a transport block corresponding to transmission of the PUSCH, the mobile station apparatus 1 determines the values of the parameters by using the information relating to the parameters. Then, the mobile station apparatus 1 generates the DMRS sequence by using the values of the parameters.

In the case where the mobile station apparatus 1 has received on a PDSCH a random access response containing a random access response grant used for scheduling of a PUSCH, initial transmission of the PUSCH has been scheduled in accordance with the random access response grant, and the mobile station apparatus 1 has not received on a PDCCH the downlink control information (DCI format 0) for a transport block corresponding to transmission of the PUSCH scheduled in accordance with the random access response grant, the mobiles station apparatus 1 sets the values of the parameters ($f^{(1)}_{DMRS}$, $f^{(2)}_{DMRS}$, $f^{(1)}_{SH}$, and $f^{(2)}_{SH}$) to 0.

That is, in the case where the mobile station apparatus 1 performs transmission of a message 3 on a PUSCH on the basis of a random access response grant contained in a random access response received on a PDSCH as part of Contention based Random Access (that is, in the cases of T701 and T703 in FIG. 9), the mobile station apparatus 1 sets the values of the parameters ($f^{(1)}_{DMRS}$, $f^{(2)}_{DMRS}$, $f^{(1)}_{SH}$, and $f^{(2)}_{SH}$) to 0. In the case where the mobile station apparatus 1 performs retransmission of a message 3 on a PUSCH on the basis of downlink control information (DCI format 0) received on a PDCCH as part of Contention based Random Access (that is, in the cases of T705 and T707 in FIG. 9), the mobile station apparatus 1 sets the values of the parameters ($f^{(1)}_{DMRS}$, $f^{(2)}_{DMRS}$, $f^{(1)}_{SH}$, and $f^{(2)}_{SH}$) to 0.

Note that in the case where the mobile station apparatus 1 performs transmission of a transport block on a PUSCH as part of Contention based Random Access, the mobile station apparatus 1 does not set the value of the cell specific parameter $\Delta_{ss}$ to 0.

Hereinafter, operations of the mobile station apparatus of the present invention will be described.

Figure 10:
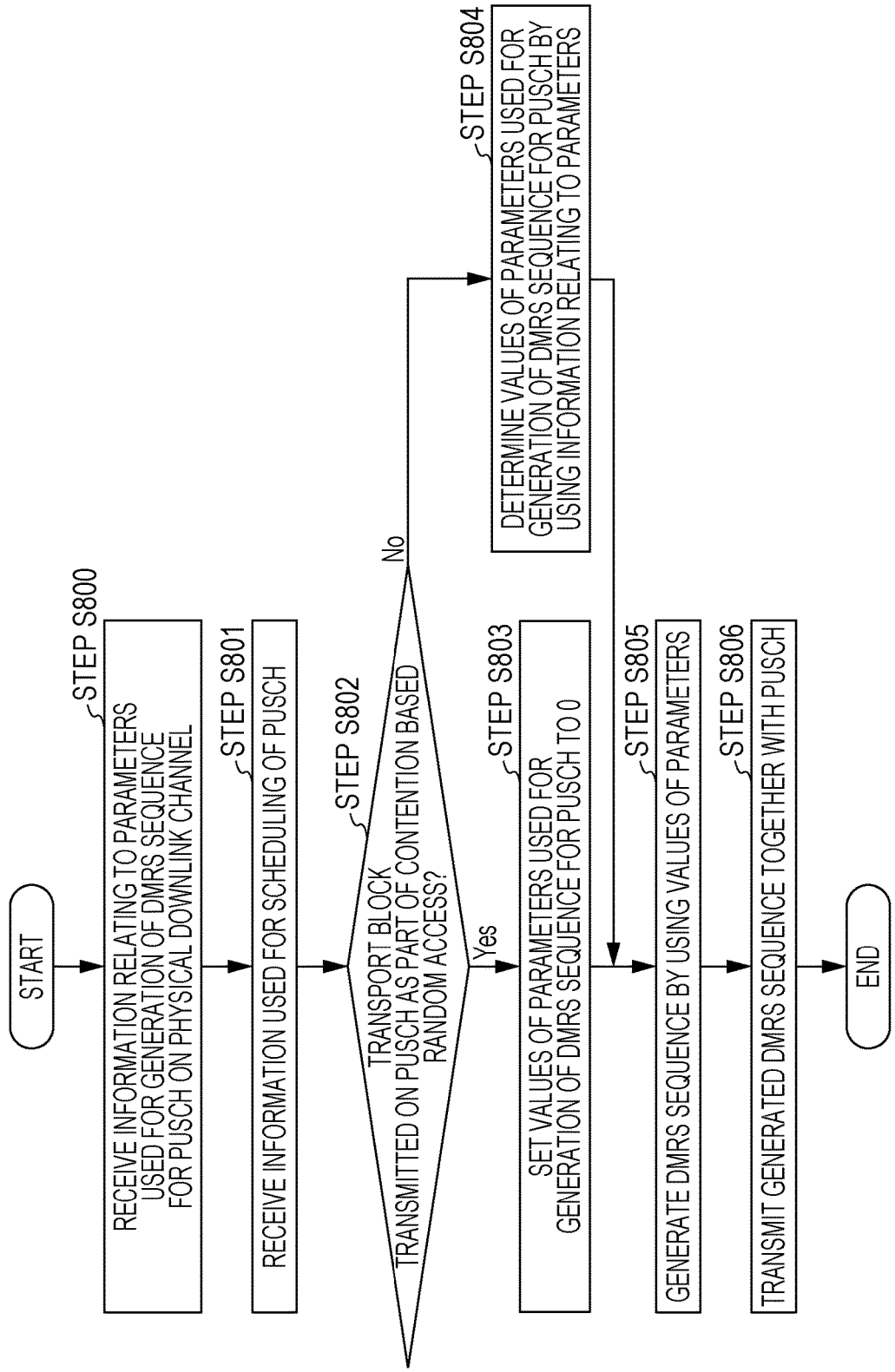
FIG. 10 is a flowchart illustrating an example of processing relating to transmission of a DMRS sequence performed by the mobile station apparatus 1 of the present invention.
Figure 11:
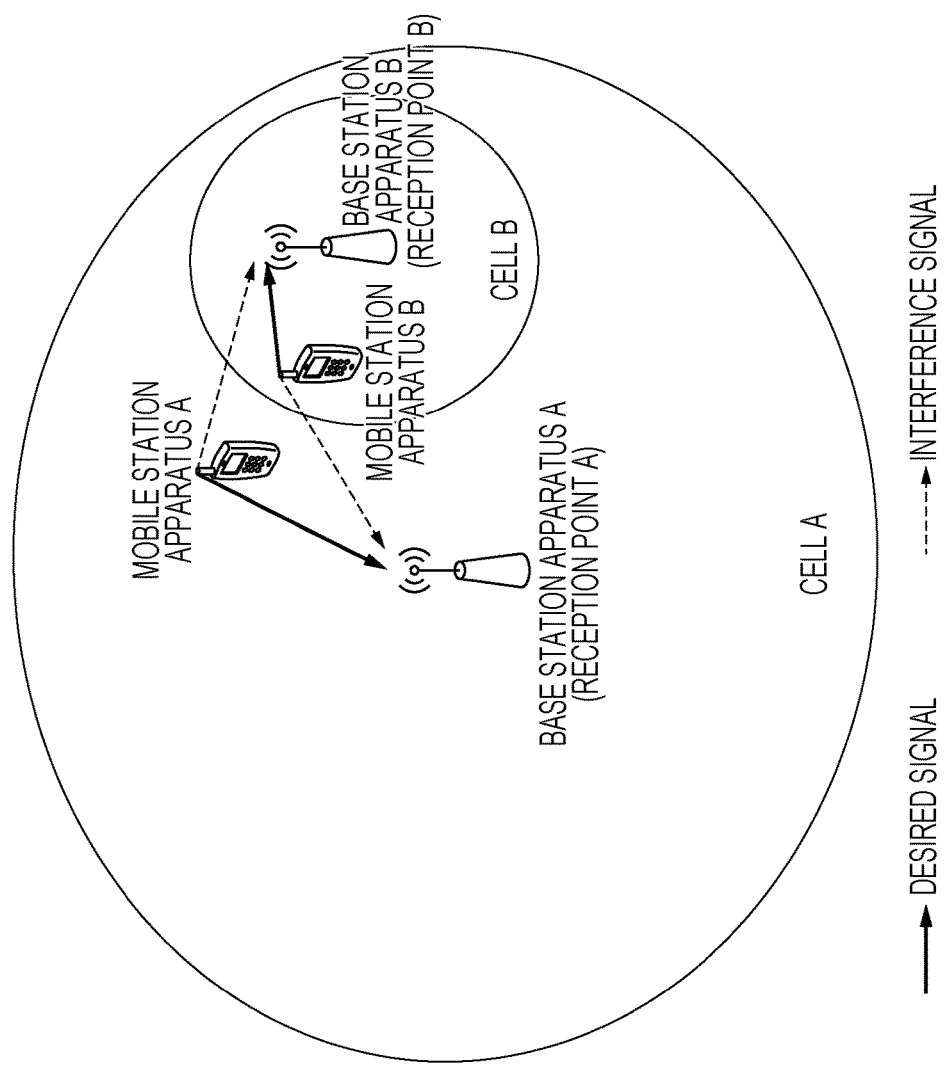
FIG. 11 is a diagram illustrating interference signals from mobile station apparatuses to adjacent cells in the related art.

FIG. 10 is a flowchart illustrating an example of processing relating to transmission of a DMRS sequence performed by the mobile station apparatus 1 of the present invention. First, the mobile station apparatus 1 receives on a physical downlink channel (PDSCH or PDCCH) information relating to the parameters ($f^{(1)}_{DMRS}$, $f^{(2)}_{DMRS}$, $f^{(1)}_{SH}$, and $f^{(2)}_{SH}$) used for generation of a DMRS sequence for a PUSCH (step S800). The mobile station apparatus 1 receives on a physical downlink channel (PDSCH, PDCCH) information (a random access response grant, an uplink grant) used for scheduling of a PUSCH (step S801).

If transmission of a transport block on the PUSCH is performed on the basis of the information received in step S801 as part of Contention based Random Access (Yes in step S802), the mobiles station apparatus 1 sets the values of the parameters used for generation of a DMRS sequence for the PUSCH to 0 (step S803). If transmission of a transport block on the PUSCH is performed on the basis of the information received in step S801 regardless of Contention based Random Access (No in step S803), the mobiles station apparatus 1 determines the values of the parameters by using the information relating to the parameters received in step S800.

The mobile station apparatus 1 determines the sequence group number u and the base sequence number v by using the values of the parameters determined in step S803 or step S804, and generates a DMRS sequence by using the sequence group number u and the base sequence number v that have been determined (step S805). The mobile station apparatus 1 transmits the DMRS sequence generated in step S805 together with the PUSCH (step S806). That is, the mobile station apparatus 1 multiplexes SC-FDMA symbols obtained by SC-FDMA-modulating the DMRS sequence generated in step S805 with SC-FDMA symbols of the PUSCH and transmits the result.

Consequently, the base station apparatus 3 can estimate the sequence group number u and the base sequence number v of a DMRS sequence for a PUSCH corresponding to a message 3 to be transmitted by the mobiles station apparatus 1, perform channel estimation from the DMRS of the PUSCH corresponding to transmission of the message 3, and perform channel compensation for the PUSCH corresponding to transmission of the message 3. Furthermore, the base station apparatus 3 can control the sequence group number u and the base sequence number v of a DMRS sequence for a PUSCH not corresponding to a message 3 for individual mobile station apparatuses 1.

A program runs on the base station apparatus 3 and the mobile station apparatus 1 of the present invention may be a program that controls a CPU (Central Processing Unit) or the like (a program causing a computer to function) so as to implement the function of the foregoing embodiment of the present invention. Information handled by the apparatuses is temporarily stored in a RAM (Random Access Memory) when being processed, is thereafter stored in various ROMs, such as a Flash ROM (Read Only Memory), or in an HDD (Hard Disk Drive), is read by the CPU as necessary, and is modified and rewritten.

Note that part of the mobile station apparatus 1 and the base station apparatus 3 in the foregoing embodiment may be implemented by a computer. In this case, implementation may be such that a program for implementing the control function is recorded in a computer readable recording medium, and the program recorded in the recording medium is read and executed by a computer system.

Note that the "computer system" here is a computer system integrated into the mobile station apparatus 1 or in the base station apparatus 3 and includes an OS and hardware, such as a peripheral device. The "computer readable recording medium" is a portable medium, such as a flexible disk, a magneto-optical disk, a ROM, or a CD-ROM, or a storage device, such as a hard disk integrated into the computer system.

Furthermore, the "computer readable recording medium" may include a device that dynamically retains a program for a short period of time, such as a communication line used in the case of transmitting a program over the Internet or other networks or via a telephone line or other communication circuits, and a device that retains a program for a certain period of time, such as a volatile memory in the computer system that serves as a server or a client in the foregoing case. The program may be a program for implementing part of the function described above or may be a program that can implement the foregoing function in combination with a program already recorded in the computer system.

Part or all of the mobile station apparatus 1 and the base station apparatus 3 in the foregoing embodiment may be typically implemented as an LSI, which is an integrated circuit, or may be implemented as a chipset. The functional blocks of the mobile station apparatus 1 and the base station apparatus 3 may be individually integrated into chips, or some or all of the functional blocks may be integrated into a chip. The integration into a circuit is not limited to LSI and may be implemented by using a dedicated circuit or a general purpose processor. In case a new technique for integration into a circuit, which will replace LSI, emerges with the advancement of semiconductor technology, an integrated circuit based on such a technique may be used.

While an embodiment of the present invention has been described in detail with reference to the drawings, specific configurations are not limited to those described above, and various design modifications or the like without departing from the spirit of the present invention can be made.

REFERENCE SIGNS LIST 1 (1A, 1B, 1C) mobile station apparatus
3 base station apparatus
101 higher layer processing unit
103 control unit
105 reception unit
107 transmission unit
301 higher layer processing unit
303 control unit
305 reception unit
307 transmission unit
1011 radio resource control unit
1013 scheduling information interpretation unit
3011 radio resource control unit
3013 scheduling unit
3015 control information generation unit

The invention claimed is:

1. A mobile station apparatus comprising:
reception circuitry configured to receive, by using a higher layer message, information indicative of a first parameter for generation of a base sequence, wherein a demodulation reference signal is given by a cyclic shift and the base sequence, and the demodulation reference signal is associated with transmission of a physical uplink shared channel, and
generation circuitry configured to:
generate the base sequence which is given by a $q^{th}$ root Zadoff-Chu sequence in a case that a length of the demodulation reference signal is equal to or larger than 36, the number q being given by at least sequence group number;
determine the sequence group number based on at least the first parameter in a case that the transmission of the physical uplink shared channel corresponds to neither a random access response grant as part of a contention based random access procedure nor retransmission of a transport block as part of the contention based random access procedure, and
generate the demodulation reference signal based on the cyclic shift and the base sequence.

2. The mobile station apparatus according to claim 1, wherein
the generation circuitry configured to determine the sequence group number without the first parameter in a case that the transmission of the physical uplink shared channel corresponds to the random access response grant as part of the contention based random access procedure, or the transmission of the physical uplink shared channel corresponds to the retransmission of the transport block as part of the contention based random access procedure.

3. The mobile station apparatus according to claim 1, wherein
the transport block is identical to a transport block transmitted via the physical uplink shared channel corresponding to the random access response grant.

4. The mobile station apparatus according to claim 1, wherein
the information is specific for the mobile station apparatus.

5. The mobile station apparatus according to claim 1, wherein
the retransmission includes a retransmission which is scheduled by downlink control information with a temporary cell radio network temporary identifier, the downlink control information indicating a second parameter used to determine the cyclic shift.

6. The mobile station apparatus according to claim 1, wherein
the generation circuitry is further configured to generate the $q^{th}$ root Zadoff-Chu sequence $x_q(0), \ldots, x_q(N_{ZC}^{RS}-1)$ according to a following equation, and
$N_{ZC}^{RS}$ is given by a largest prime number such that the $N_{ZC}^{RS}$ is smaller than the length of the demodulation reference signal $$x_q(m) = e^{-j\frac{\pi qm(m+1)}{N_{ZC}^{RS}}}.$$

7. A mobile station apparatus comprising:
reception circuitry configured to receive, by using a higher layer message, information indicative of a first parameter for generation of a base sequence, wherein a demodulation reference signal is given by a cyclic shift and the base sequence, and the demodulation reference signal is associated with transmission of a physical uplink shared channel, and
generation circuitry configured to:
generate the base sequence which is given by a $q^{th}$ root Zadoff-Chu sequence in a case that a length of the demodulation reference signal is equal to or larger than 36, the number a being given by at least a sequence group number:
determine the sequence group number without the first parameter in a case that the transmission of the physical uplink shared channel corresponds to a random access response grant as part of the contention based random access procedure or the transmission of the physical uplink shared channel corresponds to retransmission of a transport block as part of the contention based random access procedure, and
generate the demodulation reference signal based on the cyclic shift and the base sequence.

8. The mobile station apparatus according to claim 7, wherein
the information is specific for the mobile station apparatus.

9. The mobile station apparatus according to claim 7, wherein
the retransmission includes a retransmission which is scheduled by downlink control information with a temporary cell radio network temporary identifier, the downlink control information indicating a second parameter used to determine the cyclic shift.

10. The mobile station apparatus according to claim 7, wherein
the generation circuitry is further configured to generate the $q^{th}$ root Zadoff-Chu sequence $x_q(0), \ldots, x_q(N_{ZC}^{RS}-1)$ according to a following equation, and
$N_{ZC}^{RS}$ is given by a largest prime number such that the $N_{ZC}^{RS}$ is smaller than the length of the demodulation reference signal $$x_q(m) = e^{-j\frac{\pi qm(m+1)}{N_{ZC}^{RS}}}.$$

11. A base station apparatus comprising:
transmission circuitry configured to transmit, by using a higher layer message, information indicative of a first parameter for generation of a base sequence, wherein a demodulation reference signal is given by a cyclic shift and the base sequence, and the demodulation reference signal is associated with a transmission of a physical uplink shared channel; and
reception circuitry configured to demodulate the physical uplink shared channel based on at least the demodulation reference signal,
wherein the base sequence of the demodulation reference signal is given by a $q^{th}$ root Zadoff-Chu sequence in a case that a length of the demodulation reference signal is equal to or larger than 36, the number q being given by at least a sequence group number, and
the sequence group number is determined based on at least the first parameter in a case that the transmission of the physical uplink shared channel corresponds to neither a random access response grant as part of a contention based random access procedure nor retransmission of a transport block as part of the contention based random access procedure.

12. The base station apparatus according to claim 11, wherein
the sequence group number is determined without the first parameter in a case that the transmission of the physical uplink shared channel corresponds to the random access response grant as part of the contention based random access procedure, or the transmission of the physical uplink shared channel corresponds to the retransmission of the transport block as part of the contention based random access procedure.

13. The base station apparatus according to claim 11, wherein
the transport block is identical to a transport block transmitted via the physical uplink shared channel corresponding to the random access response grant.

14. The base station apparatus according to claim 11, wherein
the information is specific for a mobile station apparatus.

15. The base station apparatus according to claim 11, wherein the retransmission includes a retransmission which is scheduled by downlink control information with a temporary cell radio network temporary identifier, the downlink control information indicating a second parameter used to determine the cyclic shift.

16. The base station apparatus according to claim 11, wherein
the $q^{th}$ root Zadoff-Chu sequence $x_q(0), \ldots, x_q(N_{ZC}^{RS}-1)$ is generated according to a following equation, and
$N_{ZC}^{RS}$ is given by a largest prime number such that the $N_{ZC}^{RS}$ is smaller than the length of the demodulation reference signal $$x_q(m) = e^{-j\frac{\pi qm(m+1)}{N_{ZC}^{RS}}}.$$

17. A base station apparatus comprising:
transmission circuitry configured to transmit, by using a higher layer message, information indicative of a first parameter for generation of a base sequence, wherein a demodulation reference signal is given by a cyclic shift and the base sequence, and the demodulation reference signal is associated with a transmission of a physical uplink shared channel; and
reception circuitry configured to demodulate the physical uplink shared channel based on at least the demodulation reference signal,
wherein the base sequence of the demodulation reference signal is given by a $q^{th}$ root Zadoff-Chu Sequence in a case that a length of the demodulation reference signal is equal to or larger than 36, the number q being given by at least a sequence group number,
the sequence group number is determined without the first parameter in a case that the transmission of the physical uplink shared channel corresponds to a random access response grant as part of the contention based random access procedure or the transmission of the physical uplink shared channel corresponds to retransmission of a transport block as part of the contention based random access procedure.

18. The base station apparatus according to claim 17, wherein
the information is specific for a mobile station apparatus.

19. The base station apparatus according to claim 17, wherein the retransmission includes a retransmission which is scheduled by downlink control information with a temporary cell radio network temporary identifier, the downlink control information indicating a second parameter used to determine the cyclic shift.

20. The base station apparatus according to claim 17, wherein
the $q^{th}$ root Zadoff-Chu sequence $x_q(0), \ldots, x_q(N_{ZC}^{RS}-1)$ is generated according to a following equation, and
$N_{ZC}^{RS}$ is given by a largest prime number such that the $N_{ZC}^{RS}$ is smaller than the length of the demodulation reference signal $$x_q(m) = e^{-j\frac{\pi qm(m+1)}{N_{ZC}^{RS}}}.$$

21. A radio communication method used in a mobile station apparatus comprising:

receiving, by using a higher layer message, information indicative of a first parameter for generation of a base sequence, wherein a demodulation reference signal is given by a cyclic shift and the base sequence, the demodulation reference signal is associated with transmission of a physical uplink shared channel, generating the base sequence which is given by a $q^{th}$ root Zadoff-Chu sequence in a case that a length of the demodulation reference signal is equal to or larger than 36, the number a being given by at least a sequence group number, determining the sequence group number based on at least the first parameter in a case that the transmission of the physical uplink shared channel corresponds to neither a random access response grant as part of a contention based random access procedure nor retransmission of a transport block as part of the contention based random access procedure, and generating the demodulation reference signal based on the cyclic shift and the base sequence.

22. The radio communication method used in a mobile station apparatus according to claim 21, wherein the retransmission includes a retransmission which is scheduled by downlink control information with a temporary cell radio network temporary identifier, the downlink control information indicating a second parameter used to determine the cyclic shift.

23. A radio communication method used in a mobile station apparatus comprising:

receiving, by using a higher layer message, information indicative of a first parameter for generation of a base sequence, wherein a demodulation reference signal is given by a cyclic shift and the base sequence, the demodulation reference signal is associated with transmission of a physical uplink shared channel, generating the base sequence which is given by a $q^{th}$ root Zadoff-Chu sequence in a case that a length of the demodulation reference signal is equal to or larger than 36, the number a being given by at least a sequence group number, determining the sequence group number without the first parameter in a case that the transmission of the physical uplink shared channel corresponds to a random access response grant as part of the contention based random access procedure or the transmission of the physical uplink shared channel corresponds to retransmission of a transport block as part of the contention based random access procedure, and generating the demodulation reference signal based on the cyclic shift and the base sequence.

24. The radio communication method used in a mobile station apparatus according to claim 23, wherein the retransmission includes a retransmission which is scheduled by downlink control information with a temporary cell radio network temporary identifier, the downlink control information indicating a second parameter used to determine the cyclic shift.

25. A radio communication method used in a base station apparatus comprising:

transmitting, by using a higher layer message, information indicative of a first parameter for generation of a base sequence, wherein a demodulation reference signal is given by a cyclic shift and the base sequence, and the demodulation reference signal is associated with a transmission of a physical uplink shared channel, and demodulating the physical uplink shared channel based on at least the demodulation reference signal, wherein the base sequence of the demodulation reference signal is given by a $q^{th}$ root Zadoff-Chu sequence in a case that a length of the demodulation reference signal is equal to or larger than 36, the number q being given at least a sequence group number, and the sequence group number is determined based on at least the first parameter in a case that the transmission of the physical uplink shared channel corresponds to neither a random access response grant as part of a contention based random access procedure nor retransmission of a transport block as part of the contention based random access procedure.

26. The radio communication method used in a base station apparatus according to claim 25, wherein the retransmission includes a retransmission which is scheduled by downlink control information with a temporary cell radio network temporary identifier, the downlink control information indicating a second parameter used to determine the cyclic shift.

27. A radio communication method used in a base station apparatus comprising:

transmitting, by using a higher layer message, information indicative of a first parameter for generation of a base sequence, wherein a demodulation reference signal is given by a cyclic shift and the base sequence, the demodulation reference signal is associated with a transmission of a physical uplink shared channel, and demodulating the physical uplink shared channel based on at least the demodulation reference signal, wherein the base sequence of the demodulation reference signal is given by a $q^{th}$ root Zadoff-Chu sequence in a case that a length of the demodulation reference signal is equal to or larger than 36, the number q being given by at least a sequence group number, and the sequence group number is determined without the first parameter in a case that the transmission of the physical uplink shared channel corresponds to a random access response grant as part of the contention based random access procedure or the transmission of the physical uplink shared channel corresponds to retransmission of a transport block as part of the contention based random access procedure.

28. The radio communication method used in a base station apparatus according to claim 27, wherein the retransmission includes a retransmission which is scheduled by downlink control information with a temporary cell radio network temporary identifier, the downlink control information indicating a second parameter used to determine the cyclic shift.

* * * * *